(12) United States Patent
Callis et al.

(10) Patent No.: US 6,662,235 B1
(45) Date of Patent: Dec. 9, 2003

(54) METHODS SYSTEMS AND COMPUTER PROGRAM PRODUCTS FOR PROCESSING COMPLEX POLICY RULES BASED ON RULE FORM TYPE

(75) Inventors: Gregory M. Callis, Morrisville, NC (US); Jon Kevin Franks, Holly Springs, NC (US); Lap Thiet Huynh, Apex, NC (US); Loan Nguyen, Durham, NC (US); Diane Iupe Shannon, Raleigh, NC (US); David Yu Pin Yang, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 665 days.

(21) Appl. No.: 09/645,147

(22) Filed: Aug. 24, 2000

(51) Int. Cl.$^7$ ................................................. G06F 9/54
(52) U.S. Cl. ...................................... 709/318; 709/223
(58) Field of Search ............................... 709/200–203, 709/223, 318

(56) References Cited

U.S. PATENT DOCUMENTS

| | | | | |
|---|---|---|---|---|
| 6,301,613 B1 | * | 10/2001 | Ahlstrom et al. | 709/223 |
| 6,327,618 B1 | * | 12/2001 | Ahlstrom et al. | 709/223 |
| 6,463,470 B1 | * | 10/2002 | Mohaban et al. | 709/223 |
| 6,484,261 B1 | * | 11/2002 | Wiegel | 713/201 |
| 6,550,024 B1 | * | 4/2003 | Pagurek et al. | 714/47 |

OTHER PUBLICATIONS

Internet draft entitled "Policy Core LDAP Schema," draft–IETF–policy–core–schema–07.txt, Jul. 14, 2000 ("IETF proposal").

*Hash Tables, Introduction to Algorithms*, by T.H. Cormen, C.E. Leiserson and R.L. Rivest; Chapter 12, MIT Press, 1990.

*URL Forwarding and Compression in Adaptive Web Caching, Proceeding IEEE INFOCOM 2000*; by B.S. Michel, et al., vol. 2, p. 670–678.

Mac Devine. Presentation entitled, *TCP/IP Application Availability and Workload Balancing in the Parallel Sysplex*. Share Technical Conference (Aug. 22–27, 1999).

* cited by examiner

*Primary Examiner*—St. John Courtenay, III
(74) *Attorney, Agent, or Firm*—Myers Bigel Sibley & Sajovec; Jerry W. Herndon

(57) ABSTRACT

Embodiments of the present invention include methods, systems and computer program products which provide for a complex policy rule structured in a plurality of levels wherein the complex policy rule selects an action for execution based on a plurality of individual policy conditions. An event is received having an associated value defining a point in a space covered by the individual policy conditions. The following operations are performed if the complex policy rule is a CNF policy rule. A plurality of summary conditions are generated, each of the summary conditions being associated with one of the levels. The associated value of the received event is compared to a selected one of the summary conditions to determine if the selected one of the summary conditions is met. Operations repeat for others of the summary conditions and individual policy conditions until either one of the summary conditions is not met or all individual policy conditions for one of the levels are not met, allowing the policy rule to be skipped, or until at least one of the individual policy conditions for each level is met. DNF policy rule processing is also provided.

49 Claims, 11 Drawing Sheets

METHODS SYSTEMS AND COMPUTER PROGRAM PRODUCTS FOR PROCESSING COMPLEX POLICY RULES BASED ON RULE FORM TYPE

FIELD OF THE INVENTION

The present invention relates to policy rule based operations and more particularly to policy rule based computer network systems such as computer networks.

BACKGROUND OF THE INVENTION

Computer networks have grown increasingly complex with the use of distributed client/server applications, mixed platforms and multiple protocols all in a single physical backbone. The control of traffic on networks is likewise moving from centralized information systems departments to distributed work groups. The growing utilization of computer networks is not only causing a move to new, high speed technologies, but is at the same time making the operation of computer networks more critical to day to day business operations. The use of quality of service (QoS) criteria for managing and/or contracting communication service level agreements (SLAs) is becoming increasingly common in networks, such as networks supporting Internet protocol (IP) communications.

The Internet Engineering Task Force (IETF) has proposed a set of policy schemas (object oriented models of policy classes and policy attributes) and a policy framework for managing future networks. The IETF proposed policy based networking technology is described in the Internet draft entitled "Policy Core LDAP Schema," draft-IETF-policy-core-schema-07.txt, Jul. 14, 2000 ("IETF proposal"). Among other things, the IETF proposal includes three policy classes referred to as policy rule, policy Action and policy Condition respectively. A policy rule (class policyRule) has the following semantics: "If Condition then Action." In other words, the actions (class policyAction) specified by a policy Rule are to be performed/executed only if the policy condition (class policyCondition) evaluates to TRUE.

Stated differently, the IETF proposal provides policy conditions which represent a set of criteria that are used to identify various groupings, such as host(s), routing, application(s), on which, if the condition evaluates to TRUE (i.e., is met), appropriate actions are performed. The application condition group, for example, includes, among other things, an attribute that is used to identify the content of the application data to be used in the policy condition evaluation. This data, for web requests, generally represents the Universal Resource Indicator (URI) portion of the Universal Resource Locator (URL) or the directory where the object of the request is located.

In addition to the network environment, various other areas are dependent upon operations which are policy rule based. Thus, structuring procedures or methods based upon a policy expressed as "If Condition then Action" may be generalized across a broad scope of applications where similar issues of implementation may be encountered. Some of these application environments operate under conditions without time constraints. However, implementation of such policy rule based operations in time sensitive environments, such as a high speed network environment, can place time critical demands on processing capabilities of various network communication server devices. Rapid detection of the application data type or other aspects of a communication packet processed by a communication server may be critical, for example, where service differentiation by different data types is utilized to guarantee service level agreements (SLAs) related to QoS.

As an example, in the environment of the worldwide web (Web), each hypertext transport protocol (HTTP) type request can result in different data type(s) being sent to a requesting client device from a server device. For example, an HTTP request may call for video/audio data streaming, transaction oriented data, FTP data, etc. Different data types may require different service levels to be assigned while the data is being transmitted to the client. For instance, File Transfer Protocol (FTP) type data generally requires low loss but is not highly sensitive to delays whereas video/audio data will typically be sensitive to delay but not to loss. Complex policy rule based schema, such as the IETF proposal, reference multiple levels of policy conditions to be evaluated in order to determine if a policy action specified by a corresponding complex policy rule should be executed. This may be understood by reference to its essential opposite which would be a simple policy rule containing all the elements (e.g., attributes) of policy conditions as part of the rule definition rather than relying upon explicit references to policy conditions. Such complex policy rules are evaluated so as to determine whether an associated action for the policy rule should be executed.

SUMMARY OF THE INVENTION

Embodiments of the present invention include methods, systems and computer program products which provide for processing a complex policy rule structured in a plurality of levels wherein the complex policy rule selects an action for execution based on a plurality of individual policy conditions each of the individual policy conditions being expressed as ranges and being associated with one of the levels. It is determined if the complex policy rule is a conjunctive normal form (CNF) policy rule. An event is received having an associated value defining a point in a space covered by the individual policy conditions. The following operations are performed if the complex policy condition is a CNF policy condition. A plurality of summary conditions are generated, each of the summary conditions being associated with one of the levels. The associated value of the received event is compared to a selected one of the summary conditions to determine if the selected one of the summary conditions is met. The complex policy rule may be skipped if the selected one of the summary conditions is not met. Operations repeat for others of the summary conditions and individual policy conditions until either one of the summary conditions is not met or all individual policy conditions for one of the levels are not met or until at least one of the individual policy conditions for each level is met. The complex policy rule may be skipped if either one of the summary conditions is not met or all individual policy conditions for one of the levels are not met.

In further embodiments of the present invention, methods are provided for processing a complex policy rule structured in a plurality of levels wherein the complex policy rule selects an action for execution based on a plurality of individual policy conditions, each of the individual policy conditions including a plurality of groups and being expressed as ranges for each of the groups. It is determined if the complex policy condition is a conjunctive normal form (CNF) policy condition. An event is received, the event having associated values defining a point in a space covered by the plurality of conditions. If the complex policy rule is a CNF policy rule, the following operations are performed. A plurality of summary conditions are generated, each of the summary conditions being associated with a respective one of the groups for a respective one of the levels. A respective one of the associated values of the received event is compared to an associated selected one of the summary conditions, the selected one of the summary conditions being associated with the same group of policy conditions as the respective one of the associated values of the received event, to determine if the associated one of the summary condition is met. The complex policy rule may be skipped if the associated one of the summary conditions is not met.

Comparison operations repeat for others of the summary conditions and individual policy conditions until either one of the summary conditions is not met or all individual policy conditions for one of the levels are not met or until at least one of the individual policy conditions for each of the levels is met. The complex policy rule may be skipped if either one of the summary conditions is not met or all individual policy conditions for one of the levels are not met. If the complex policy rule is a CNF policy rule, the action is executed if at least one of the individual policy conditions for each of the levels is met.

In other embodiments of the present invention, at least one of the groups is selected from the group consisting of source device internet protocol (IP) address range, destination device IP address range, inbound interface identifier (ID) range, outbound interface ID range, source device port number range, destination device port number range, protocol ID range, application name and application data classification. Summary conditions in various embodiments are provided by establishing a lowest starting value of one of the groups of one of the individual conditions associated with a level as a start value of a summary condition for that group for that level and establishing a highest ending value of the one of the groups of the one of the individual policy conditions associated with that level as an end value of the summary condition for that group for that level.

An all inclusive range may be provided as a summary condition for a group for a level if the associated range for that group of one of the individual policy conditions associated with that level is a unitary point of a first value and another of the individual policy conditions associated with that level for that group is a unitary point of a second value different from the first value. An all inclusive range may further be provided as a summary condition for a group for a level if the associated range for that group of one of the individual policy conditions associated with that level is all inclusive. In particular embodiments, one of the summary conditions most likely to not be met is selected first for testing.

In various embodiments of the present invention, comparing operations for others of the summary conditions and individual policy conditions includes comparing the associated values of the received event to ones of the individual policy conditions associated with the same level as one of the summary conditions which is met to determine if any of the individual policy conditions associated with the same level as one of the summary conditions which is met are met. In further embodiments of the present invention, comparing operations for others of the summary conditions and individual policy conditions include selecting another one of the summary conditions associated with the same level as the selected one of the summary conditions and associated with a different group of policy conditions and comparing one of the associated values of the received event associated with the different group to the another one of the summary conditions to determine if the another one of the summary conditions is met. Operations continue with others of the summary conditions until at least one of a summary condition is not met or all of the summary conditions associated with the same level are met. The associated values of the received event may further be compared to ones of the individual policy conditions associated with a level to determine if any of the individual policy conditions associated with the level are met if all of the summary conditions associated with the same level are met.

In further embodiments of the present invention, comparison operations for individual policy conditions associated with the same level are followed by comparing the associated values of the received event to ones of the summary conditions associated with another one of the levels to determine if any of the summary conditions associated with another one of the levels is not met. The associated values of the received event are then further compared to ones of the individual policy conditions associated with the another one of the levels if all of the ones of the summary conditions associated with the another one of the levels are met to determine if any of the ones of the individual policy conditions associated with the another one of the levels are met. Such level by level operations may repeat for others of the plurality of levels until either one of the summary conditions is not met or all individual policy conditions for one of the levels are not met or until at least one of the individual policy conditions for each level is met.

In other embodiments of the present invention, it is determined if the complex policy rule is a disjunctive normal form (DNF) policy rule and, if so, the following operations are performed. A plurality of collapsed conditions is generated, each of the collapsed conditions being associated with one of the levels and having a range for each group of policy conditions. The associated values of the received event are compared to a selected one of the collapsed conditions to determine if the selected one of the collapsed conditions is met. Another one of the collapsed conditions is selected and compared to the associated values of the received event to determine if the selected another one of the collapsed conditions is met if the previously selected one of the collapsed conditions is not met. Operations continue for others of the collapsed conditions until either a collapsed condition is met or all of the collapsed conditions are not met. The action associated with the complex policy rule is executed if one of the collapsed conditions is met and the complex policy rule is a DNF policy rule.

In further embodiments of the present invention, it is determined that a collapsed condition is not met if any one of the ranges of the collapsed condition is not met. One of the plurality of collapsed conditions which is most likely to be met may be selected to be the first one of the plurality of collapsed conditions to be compared to a received event. In other embodiments of the present invention, an intersection of associated ranges of all individual policy conditions associated with each group of policy conditions included in a particular level is established as one of the plurality of collapsed conditions associated with the particular level.

While the invention has been described above primarily with respect to the method aspects of the invention, both systems and/or computer program products are also provided.

DETAILED DESCRIPTION OF PREFERRED EMBODIMENTS

Figure 1:
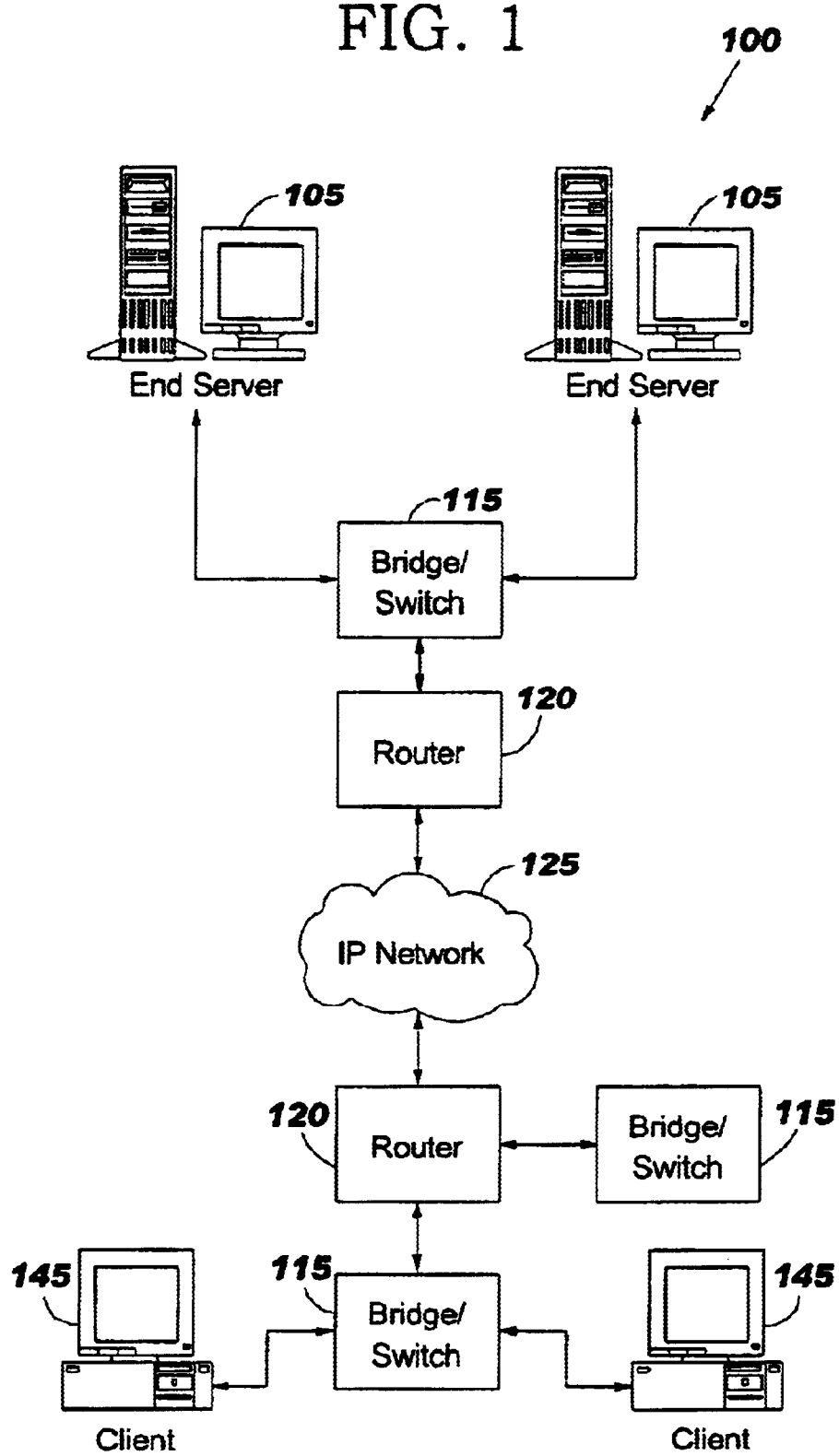
FIG. 1 is a block diagram of a network environment in which the present invention may be implemented.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As will be appreciated by one of skill in the art, the present invention may be embodied as a method, data processing system, or computer program product. Accordingly, the present invention may take the form of an entirely hardware embodiment, an entirely software embodiment or an embodiment combining software and hardware aspects. Furthermore, the present invention may take the form of a computer program product on a computer-usable storage medium having computer-usable program code means embodied in the medium. Any suitable computer readable medium may be utilized including hard disks, CD-ROMs, optical storage devices, a transmission media such as those supporting the Internet or an intranet, or magnetic storage devices.

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language. The program code may execute entirely on the user's computer, partly on the user's computer, as a standal-one software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including computer-readable program code (instructions) means which implements the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart and/or block diagram block or blocks.

Referring first to the block diagram illustration of FIG. 1, a network environment in which the present invention may be implemented will be generally described. As illustrated in FIG. 1, the communication network 100 includes a plurality of connecting nodes and endpoint nodes. As shown in FIG. 1, two endpoint servers 105 and two clients 145 are shown which are endpoints on the communication network 100. However, additional devices may be connected or a single computer device may serve as both a server and a client in different transactions and may further function as a connecting node between network 100 and another network.

As shown in FIG. 1, endpoint servers 105 connect through a bridge switch 115 and a router 120 to the IP network 125. Clients 145 are also connected to the IP network 125 through a bridge/switch 115 and a router 120. Additional bridge/switches 115 and routers 120 may be included in the IP network 125 as will be understood by one of ordinary skill in the art.

The communication network 100 may be provided by wired or wireless links using a variety of physical layer media and still stay within the teachings and scope of the present invention. Furthermore, while the present invention is described primarily in the context of communication networks and control of communication traffic on such networks, the present invention is not so limited and may be utilized beneficially in processing events based on policy rules, particularly in environments where processing speed for automatically identifying and executing an appropriate policy rule action is important. For example, fast methodologies for processing communication requests (such as those designated by an HTTP address) for assignment of appropriate QoS based on policy rules is desirable for use with communication servers handling communications over networks, such as the communication network 100. The routers 120 may operate as communication servers to provide appropriate service levels to packets routed through the respective routers 120 based on complex policy rules.

In addition to use with link type devices such as router 120 or bridge/switches 115, rule based processing of communication requests may also be beneficially implemented in endpoint devices such as servers 105 or clients 145. Such capabilities may be particularly beneficial in light of emerging network trends where service differentiation is important in guaranteeing service level agreement (SLA) performance. Various embodiments of the present invention, as will be described herein, may provide for processing of policy rules differently for conjunctive normal form (CNF) and disjunctive normal form (DNF) rule types. This approach may reduce the overall number of policy rules that need to be processed and/or the time required on average to process each policy rule in real time.

Figure 2:
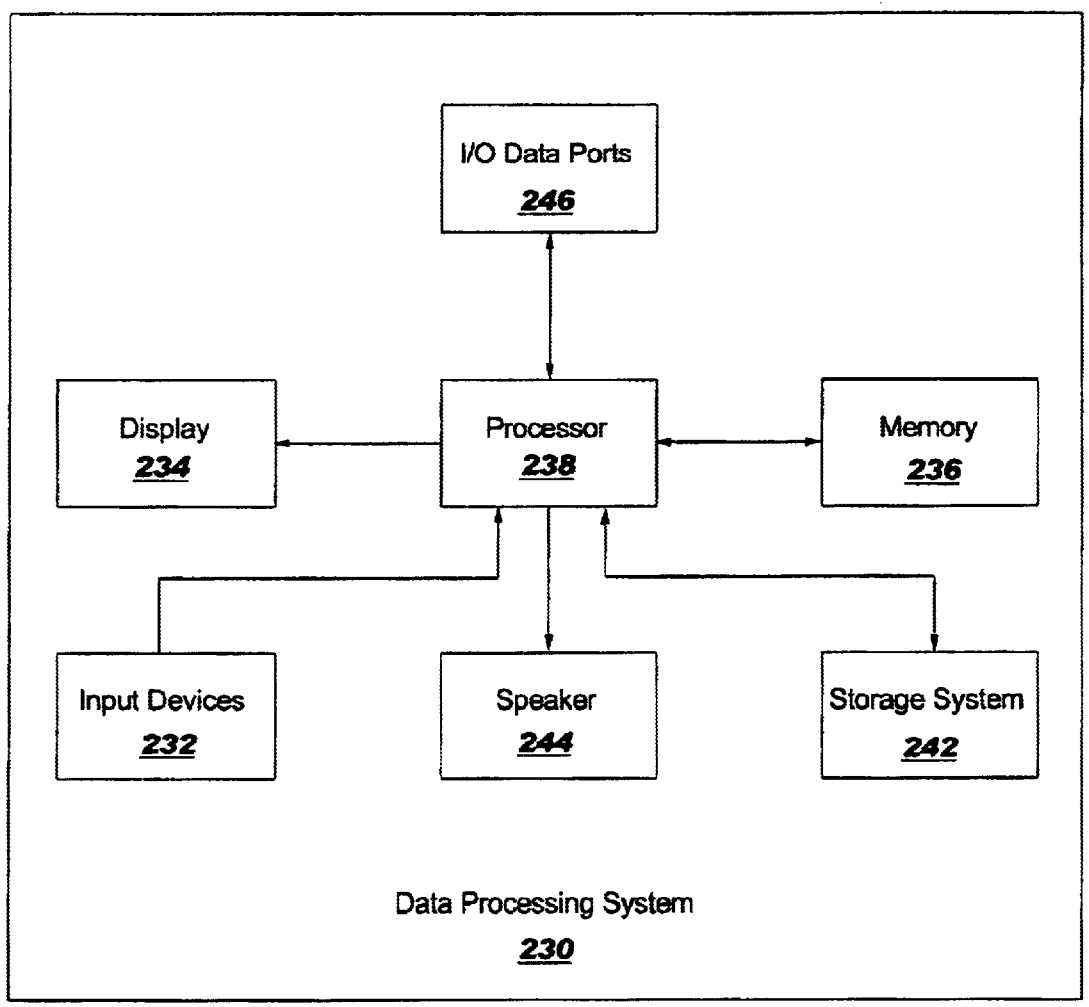
FIG. 2 is a block diagram of data processing systems according to embodiments of the present invention.

The present invention will now be further described with reference to the block diagram of FIG. 2 which illustrates data processing systems according to embodiments of the present invention. As illustrated in FIG. 2, the system 230 may include input device(s) 232 such as a keyboard or keypad, a display 234, and a memory 236 that communicate with a processor 238. The data processing system 230 may further include a storage system 242, a speaker 244 and an I/O data port(s) 246 that also communicate with the processor 238. The storage system 242 may include removable and/or fixed media such as floppy disks, ZIP drives, hard disks or the like as well as virtual storage such as a RAMDISK. The I/O data port 246 can be used to transfer information between the data processing system 230 and another computer system or a network (e.g., the Internet). Such data processing systems may include, for example, personal computers, laptop computers, mainframe computers, pervasive computing devices such as personal digital assistants, smartphones or the like, or even embedded processing systems. The components of a particular data processing system may be conventional or custom components, such as those used in many conventional computing devices, which may be configured to operate as described herein.

Figure 3:
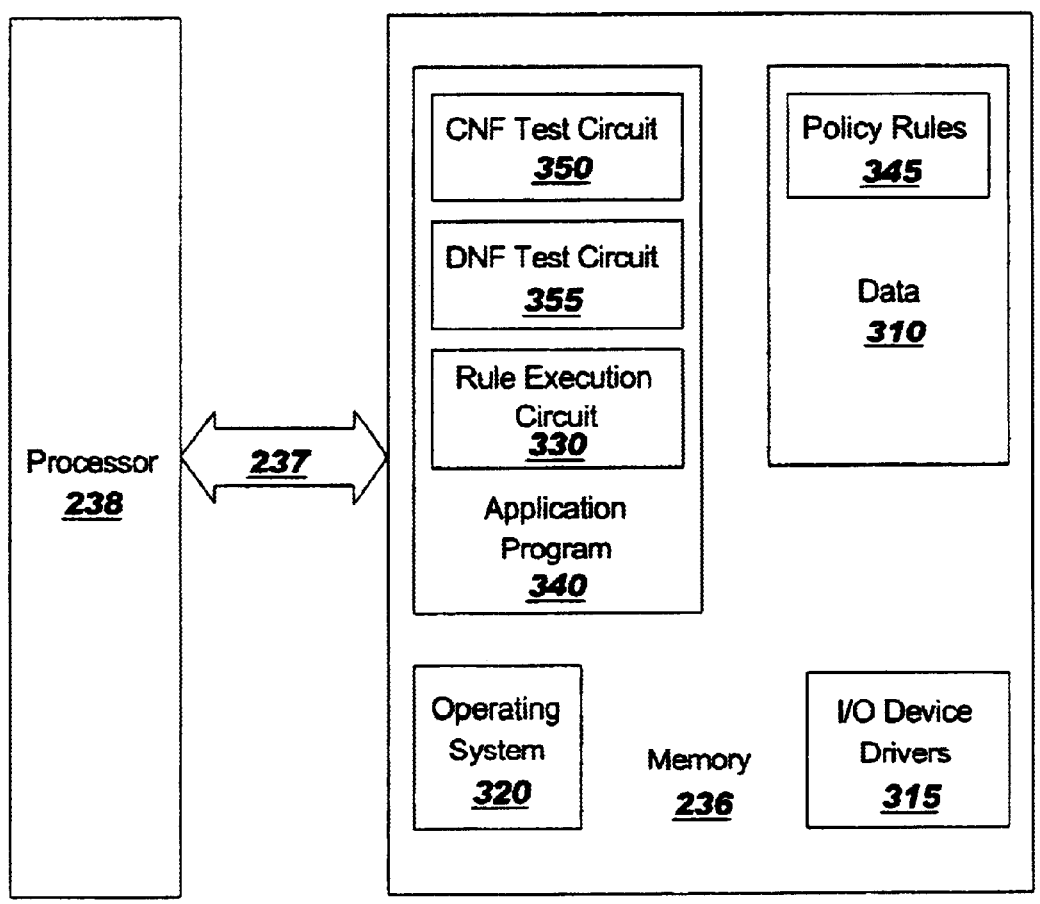
FIG. 3 is a more detailed block diagram of data processing systems according to embodiments of the present invention.

FIG. 3 is a block diagram of a data processing system that illustrates systems, methods, and computer program products in accordance with embodiments of the present invention. The processor 238 communicates with the memory 236 via an address/data bus 237. The processor 238 can be a commercially available or custom microprocessor. The memory 236 is representative of the overall hierarchy of memory devices containing the software and data used to implement the functionality of the data processing system 230. The memory 236 can include, but is not limited to, the following types of devices: cache, ROM, PROM, EPROM, EEPROM, flash memory, SRAM, and DRAM.

As shown in FIG. 3, the memory 236 may contain several categories of software and data used in the data processing system 230: the operating system 320; the application program 340; the input/output (I/O) device drivers 315; and the data 310. As will be appreciated by those of skill in the art, the operating system 320 may be any operating system suitable for use with a data processing system, such as OS/2, AIX or OS/390 from International Business Machines Corporation, Armonk, N.Y., WindowsCE, WindowsNT, Windows95, Windows98 or Windows2000 from Microsoft Corporation, Redmond, Wash., PalmOS from Palm, Inc., MacOS from Apple Computer, UNIX or Linux, proprietary operating systems or dedicated operating systems, for example, for embedded data processing systems.

The I/O device drivers 315 typically include software routines accessed through the operating system 320 by the application program 340 to communicate with devices such as the input devices 232, the display 234, the speaker 244, the storage system 242, the I/O data port(s) 246, and certain memory 236 components. The application program 340 is illustrative of the programs that implement the various features of the data processing system 230. Finally, the data 310 represents the static and dynamic data used by the application program 340, operating system 320, I/O device drivers 315, and other software programs that may reside in the memory 236.

As is further seen in FIG. 3, the application program 340 preferably includes a rule execution circuit 330, a DNF test circuit 355 and a CNF test circuit 350. The rule execution circuit 330 is configured to identify whether a policy rule in policy rules memory 345, is a DNF type or CNF type complex policy rule. The rule execution circuit 330 is further configured to execute an action associated with such rules if the conditions for the complex policy rule are evaluated as TRUE (i.e., met). The CNF test circuit 350 and the DNF test circuit 355 are configured to process conditions for rules being considered for execution in association with an event according to the procedures which will be described further herein with reference to the flowchart illustrations of FIGS. 4–8 and the block diagram illustrations of FIGS. 9A–9C.

While the present invention is illustrated, for example, with reference to an application program 340 which carries out the operations, as will be appreciated by those of skill in the art, these functions may also be incorporated into, for example, the operating system 320. Thus, the present invention should not be construed as limited to the configuration of FIG. 3 but is intended to encompass any configuration capable of carrying out the operations described herein.

Operations according to various embodiments of the present invention for processing a complex policy rule structured in a plurality of levels wherein the complex policy rule selects an action for execution based on a plurality of individual policy conditions, each of the individual policy conditions being expressed as ranges and being associated with one of the levels, will now be described further with reference to the flowchart illustrations of FIGS. 4–8.

To better provide for understanding the explanation of operations according to various embodiments of the present invention with reference to the flowchart illustrations, a further explanation will first be provided of DNF and CNF type forms of complex policy rules. Note that the terminology used throughout this description assumes such complex policy rules must ultimately result in a TRUE condition before associated actions are performed. However, it is to be understood that inverse logic may also be used in keeping with the present invention. To avoid confusion, as used herein with reference to an assessment of conditions for a policy rule, the terms "TRUE" or "met" will be used interchangeably and will refer to a condition or a combination of conditions which are satisfied by associated values of an event against which the complex policy rule is being applied.

As will become clear in the context of the description of the flowcharts below, complex policy rule evaluation in accordance with various embodiments of the present invention is determined based on whether the conditions for the complex policy rule are represented as either a DNF or CNF form. A CNF form represents an ANDed set of ORed conditions. In other words, for a CNF type complex policy rule, the individual conditions are grouped by an OR operation within each individual level and the results of the OR operation at each respective level are ANDed together from the different levels to provide the output determination of the complex policy rule. In contrast, a DNF type complex policy rule represents an ORed set of ANDed conditions. In other words, individual conditions are ANDed with each other for each individual level of the complex policy rule and the results of the ANDed operations from each level are ORed together to provide a result.

The distinction between DNF and CNF type complex policy rules will now be further explained by way of an example. In particular, assume a policy rule (R1) has 5 individual conditions that are grouped into two levels. These five individual conditions will be designated C1.1, C1.2, C1.3, C2.1 and C2.2. These designations apply C as an indication of a condition, the first number after the condition as an identifier of the level to which the respective condition belongs, and the second number identifying the individual condition number within a level so as to distinguish individual conditions at each level.

Using this notation, a complex policy rule of a DNF type would have its overall condition requirement expressed as follows:

(C1.1 AND C1.2 AND C1.3) OR (C2.1 AND C2.2)

It will be understood that this combination of conditions requires that either C1.1, C1.2 and C1.3 all evaluate to TRUE or that C2.1 and C2.2 both evaluate to TRUE in order for the overall condition to be true. The actions associated with the complex policy rule will be performed under either of these combinations of conditions.

Where rule R1 is provided with a CNF type form, then the overall condition combination to be evaluated for R1 may be expressed as follows:

(C1.1 OR C1.2 OR C1.3) AND (C2.1 OR C2.2)

Applying this CNF type complex policy rule condition set requires that at least one of C1.1, C1.2, or C1.3 must evaluate to TRUE and at least one of C2.1 or C2.2 must evaluate to TRUE in order for the overall condition to be TRUE. Again, as was noted previously, each of the individual conditions may be inverted (negated) while still falling within the scope of the present invention.

To further aid in understanding the following description, examples of conditions which may be utilized in the context of the communication network 100 will now be provided. A communication server set of conditions could be drawn from various groups, such as host-condition, routing-condition and application-condition. Each grouping may have a variety of individual conditions. Examples of such conditions include source device Internet protocol (IP) address range, destination device IP address range, inbound interface identifier (ID) range, outbound interface ID range, source device port number range, destination device port number range, protocol ID range, application name and application data classification. As will be understood by those of skill in the art, a variety of additional conditions may be utilized in a communications network environment and various of the listed conditions may not be utilized in particular communication network environments. Furthermore, different conditions may be used in different application environments and the present invention is not intended to be limited to the above listed conditions which are provided solely by way of example.

To further facilitate understanding of the flowcharts which follow, a "collapsed" condition and a "summary" condition will now be described generally and by way of examples to facilitate understanding. As used herein, both a collapsed and a summarized condition may be understood as converting a complex set of conditions into a simple (or single) condition for purposes of evaluation. The collapsed condition is generally based on the intersection (AND) of the individual conditions whereas the summary condition is generally based on the union (superset OR) of the individual conditions as will be described further herein.

Note that groups of conditions, such as those described above in the context of a communication network 100, are drawn from regions established by different ranges of different attributes. For example, a source address range may run from 9.37.80.0 to 9.37.80.254 and a destination port range may run from 20 to 21. Similarly, an event, such as a received packet, may be understood to define a point in the region covered by the ranges of the conditions where the events "point" is established by its characteristics. For example, the packet source address of 9.37.80.1 and a destination address of 21.

Note that the different groups are generally not compatible (i.e., they define different axis in the multi-dimensional space defined by the conditions) and, therefore, each type of group included in the individual conditions will generally be processed separately for purposes of collapse and summarize operations. For example, the source address range examples and destination port range examples given above would result in a nonsensical output if they were to be summarized or collapsed with each other. Accordingly, while the respective collapsed and summarized conditions may be referred to in the singular herein, in various embodiments involving a plurality of different groups, such singular reference should generally be understood to refer to a respective summary or collapse combination defined by a range for each group included within a respective level. Moreover, where some individual conditions at a level do not include any limitation related to a group which defines a range limitation on another of the individual conditions, both individual conditions still may be considered as having an associated range for the group only found as a restriction in one individual condition. The associated range for that group for the individual condition not including any limitation on that group will be considered as the superset "all inclusive" which will be satisfied by any incoming event. In other words, as an individual group is not a limitation of some individual condition, all incoming events will satisfy that group for that individual event.

Continuing the explanation definition of summarized and collapsed conditions, a collapsed condition may be obtained by ANDing together the values of same attributes in different conditions at a level. For example, if C1.1 has a source address range of 9.37.80.0 through 9.37.80.128, and C1.2 has a source address range of 9.37.80.100 through 9.67.0.0, a collapsed condition of C1.1 and C1.2 for source address will have a source address range of 9.37.80.100 through 9.37.80.128. In contrast, a superset (OR) summarized condition of C1.1 and C1.2 for this same example will have a source address range of 9.37.80.0 through 9.67.0.0.

In various embodiments of the present invention, a collapsed condition and a summarized condition may be provided with additional properties. For example, in the general case where two conditioned attributes contain ranges that do not intersect, there is no collapsed condition (i.e., the collapsed condition defines a null set) but there exists a summarized condition. The summarized condition may be defined in various embodiments as containing as its range the lower starting value of the two ranges and the higher ending value of the two ranges. More particularly, a lower starting value of one of the individual conditions associated with a level, the condition having the lower starting value, is defined as the starting value of the summary condition for that level. An ending value of one of the individual conditions associated with that level, in particular, the individual condition having the highest ending value, is assigned as the ending value for the summary condition for that level.

In further embodiments, the intersection (for the collapsed condition) for a range value v1-v2, and a range value of 0-0 (where 0-0 defines the "all inclusive" set, such as the circumstance described above where one of the individual conditions does not include a specification for a particular group which is included in another of the individual conditions on that level). is itself (i.e., v1-v2). In contrast, the superset (for the summarized condition) may be provided with the "all inclusive" range. In other words, an all inclusive range may be designated as the summary condition for a level if the associated range of one of the individual policy conditions associated with that level is all inclusive (not limited by) that respective group. Particular properties may also be provided for attributes (groups) that contain only a single value. As used herein, a single value may be understood to be an associated range having only a single point value with such single point values considered a subset of the term "range." Similarly, the "all inclusive" range is considered a subset of candidate ranges even though the actual condition may be expressed by simply not including a term associated with the group for which an all inclusive condition is desired.

In specific embodiments of the present invention, for individual conditions where two different individual conditions have single value ranges which differ, the summarized condition may be designated as having the all inclusive range as a way to represent the inclusive set and the resulting summarized condition. In other words, where the associated range for one of the individual policy conditions associated with a level is a unitary point of a first value and another of the individual policy conditions associated with that level also has a unitary point for that group, but of a second value different from the first value, an all inclusive range is generated as a summary condition for the level. With this understanding of both the general usage of the terms collapsed condition and summarized condition and with further understanding of particular properties of such conditions for specific embodiments of the present invention, the invention will now be further described with reference to various embodiments illustrated in the flowchart illustrations of FIGS. 4–8.

Figure 4:
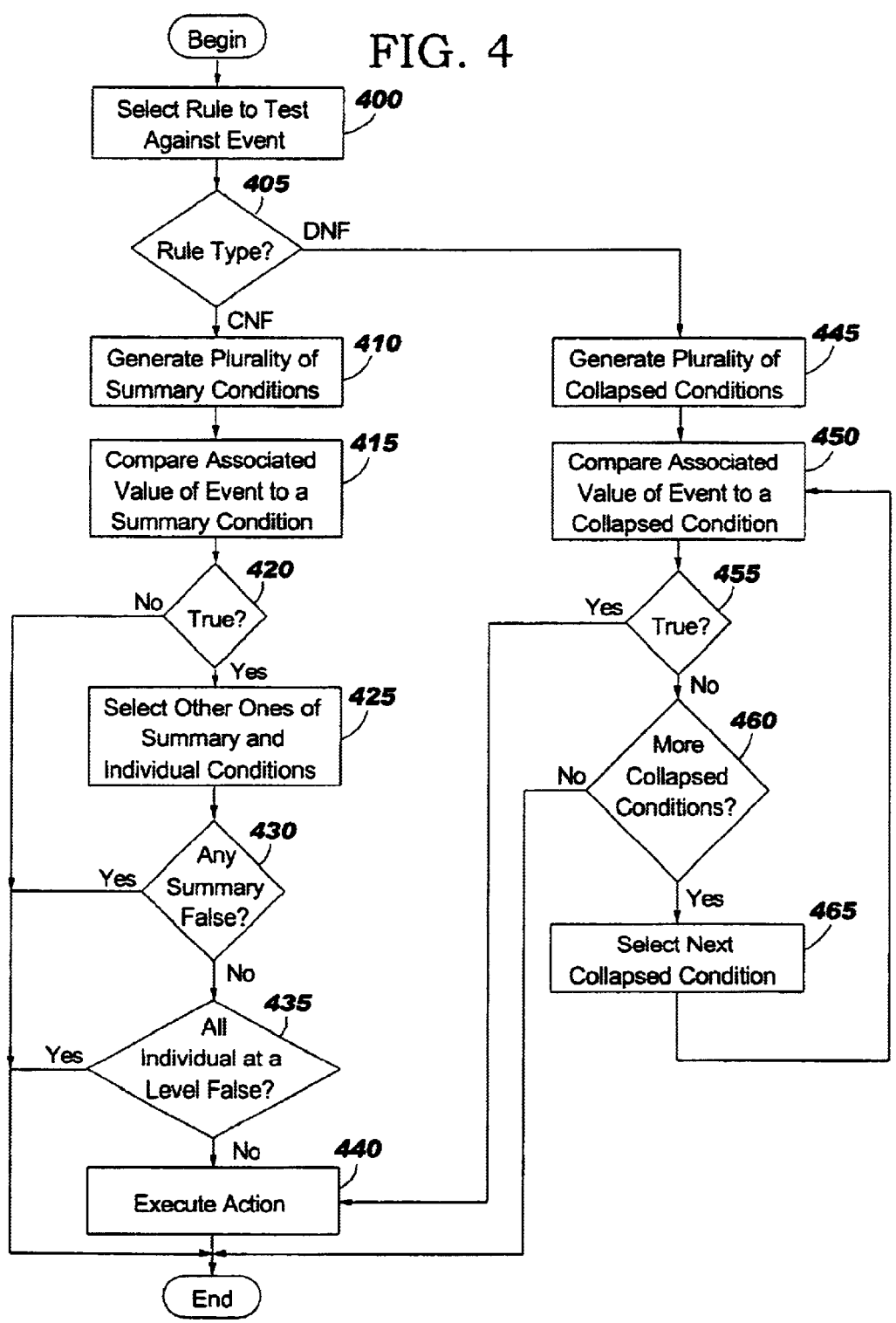
FIG. 4 is a flowchart illustrating operations according to embodiments of the present invention.

Referring first to FIG. 4, operations begin at block 400 with selection of a rule to test against an event. While the flowchart illustration will be used to describe processing of a single policy rule, it is to be understood that the rule execution circuit 330 will typically process a plurality of candidate policy rules for each received event and each such candidate policy rule may be individually processed according to the inventive procedures described herein. It is also to be understood that an event against which a policy rule is to be automatically evaluated may take a broad variety of forms. However, for simplicity of explanation in the examples provided herein, the discussion will focus on the application environment of a communication network and processing of data across such a communication network, such as the network 100 illustrated in FIG. 1. A broad variety of events which may require automatic processing pursuant to complex policy rules may similarly be processed for other environments in the manner described herein in the context of a communication network 100.

The event to be tested against a selected candidate policy rule at block 400 may be received, for example, at a router 120 (e.g., as a Web request communication packet). The event has at least one associated value defining a point in a condition determination space covered by the individual policy conditions included in the candidate complex policy rule. The event may also be provided by user input or retrieved from storage in various embodiments of the present invention.

At block 405, the rule execution circuit 330 determines if the candidate complex policy rule is a DNF or CNF type policy rule. If the candidate policy rule is a CNF type policy rule (block 405), a CNF test circuit 350 generates a plurality of summary conditions, each of the summary conditions being associated with one of the levels of the complex policy rule (block 410).

As described above, the event being tested against the candidate complex policy rule may be visualized as defining a point within a space defined by one or more groups for which ranges are specified as conditions by various individual conditions included in the complex policy rule. Accordingly, the associated value of the event being tested is compared to a selected one of the plurality of summary conditions to determine if the selected one of the summary conditions is met (block 415). If the selected one of the summary conditions is not met (block 420), then the conditions for the candidate policy rule are necessarily not met and operations with reference to the candidate policy rule under test cease without execution of the associated action. Thus, it may be determined that the candidate complex policy rule may be skipped when the selected one of the summary condition is not met (block 420).

Where the first selected summary condition is met (block 420) comparing operations continue for others of the summary conditions and individual policy conditions until one of the summary conditions is not met, all individual policy conditions for one of the levels are not met or at least one individual policy condition for each level is met as will be described generally with reference to blocks 425 through 435. At block 425 another one of the summary conditions or individual conditions is selected for testing. If any of the selected summary conditions is not met (block 430), or if all individual policy conditions for one of the levels are not met (block 435), it is determined that the complex policy rule being tested may be skipped and the associated action is not executed. If, however, all summary conditions are met (block 430) and at least one of the individual policy conditions for each level is met (block 435), the action associated with the policy rule is executed (block 440).

Note that, for various embodiments of the present invention, specific procedures for selecting ones of the summary conditions and individual conditions are provided which may provide a sequence of testing intended to facilitate early detection of a failed condition of a candidate policy rule. This early detection may expedite moving on to testing a next candidate complex policy rule without spending unnecessary time performing calculations on other conditions associated with a candidate policy rule once it has been determined that the complex policy rule will not be met. Such aspects of these various particular embodiments will be described further with reference to FIG. 7 and FIG. 8.

If the candidate complex policy rule is a DNF policy rule (block 405), a plurality of collapsed conditions are generated (block 445). Each of the collapsed conditions is associated with one of the levels and has a range for each group of policy conditions included in the level associated with the collapsed condition. The associated value of the received event is compared to the selected one of the collapsed conditions to determine if the selected one of the collapsed conditions is met (block 450). If the tested selected collapsed condition is met (block 455), the action associated with the tested candidate complex policy rule is executed (block 445).

If the collapsed condition is not met (block 455) and there remain more collapsed conditions to test (block 460), another one of the collapsed conditions is selected for testing (block 465). Operations then continue as described previously with reference to blocks 450–460 for the next selected collapsed condition. Operations may continue until either one of the collapsed conditions is met (block 455) or all of the collapsed conditions are not met (block 460). If all of the collapsed conditions are not met (block 460) it is determined that the candidate policy rule may be skipped and the associated action is not executed.

In various embodiments of the present invention, the order of selection of summarized conditions and/or collapsed conditions for testing may be determined based upon the likelihood of such conditions to be met. For example, once a summarized condition is not met (block 420) operations related to testing the conditions for that complex policy rule may cease. Accordingly, operations may include selecting one of the summary conditions most likely to not be met as the selected one of the summary conditions which is first tested at block 415. Subsequent summary conditions may similarly be selected based on their likelihood of being met relative to other, remaining, untested, summary conditions. The likelihood of being met may be determined based upon range values or other known characteristics of the operating environment, particularly for a nonuniform distribution of event likelihoods within a group or a nonuniform distribution of likelihoods of FALSE results across different groups.

Figure 5:
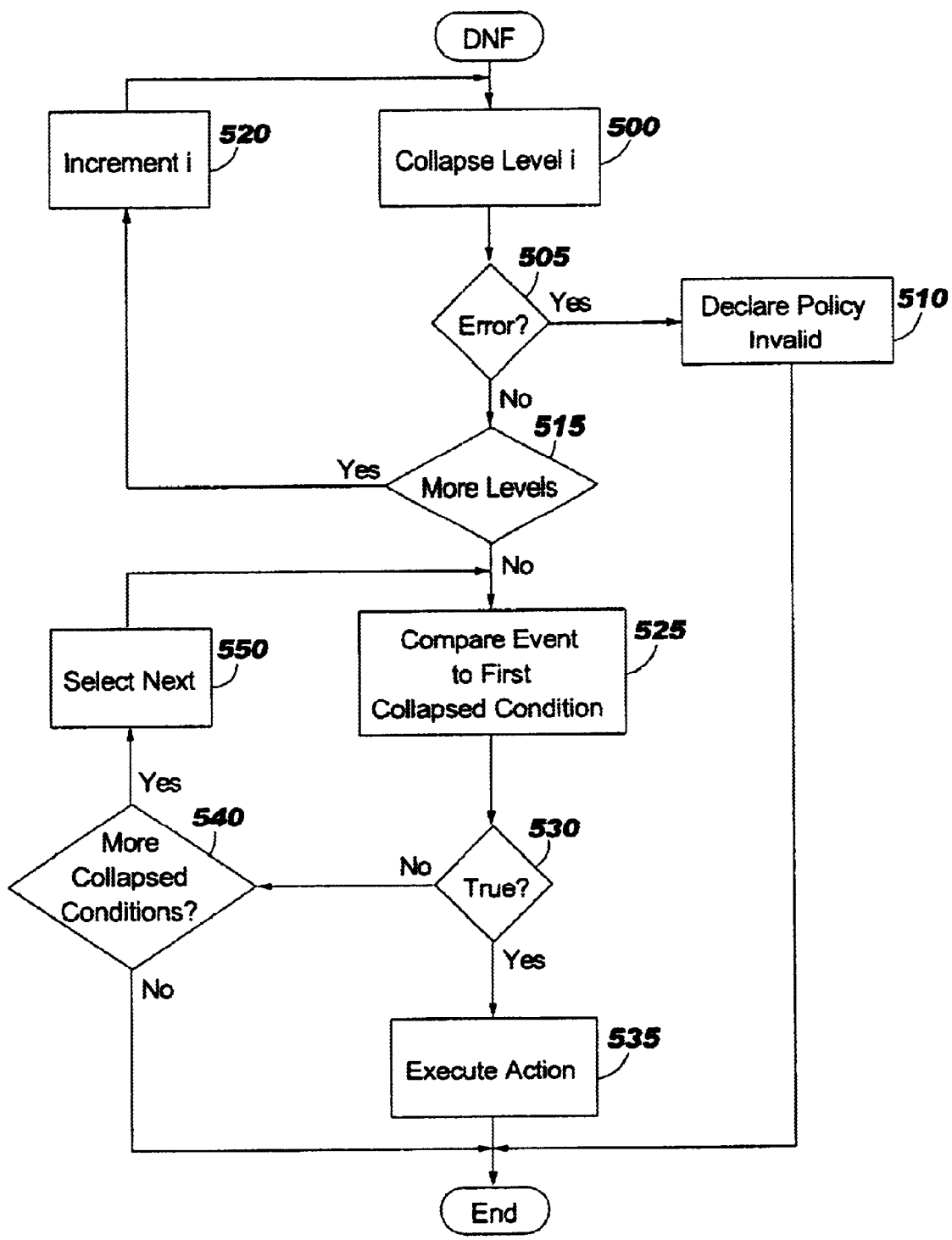
FIG. 5 is a flowchart illustrating DNF rule processing operations according to embodiments the present invention.

Referring now to FIG. 5, DNF processing operations will be further described assuming only a single group at each level. Generation of collapsed conditions will first be described with reference to blocks 500–515. Operations begin at block 500 by collapsing the individual conditions at a first level to generate a first collapsed condition associated with that level. If any error is detected in generation of the collapsed condition (block 505) the policy is declared invalid (block 510) and operations for that complex policy rule cease. Examples of errors are described below. If no such error is encountered (block 505) and if more levels remain in the complex policy rule (block 515), the next level is selected (block 520) and operations return to block 500.

Once a collapsed condition has been generated for each level (block 515), an event is compared to a first selected one of the collapsed conditions to determine if the selected one of the collapsed conditions is met (block 525). If the collapsed condition is met (block 530), then the action associated with the candidate complex policy rule is executed (block 535). If the first tested collapsed condition is not met (block 530), it is determined if any more collapsed conditions remain to be tested (block 540). If not (block 540), it is determined that the action associated with the candidate complex policy rule need not be executed and operations on that candidate complex policy rule cease. If more collapsed conditions remain to be tested (block 540), a next collapsed condition is selected (block 550) and operations return to block 525. The one of the plurality of collapsed conditions initially selected for testing in various embodiments of the present invention is the collapsed condition which is most likely to be met as any one collapsed condition being met allows execution of the action while all conditions must be not met before the processing of the candidate complex policy rule may cease.

The description of DNF processing operations with reference to FIG. 4 and FIG. 5 was generally described with reference to a single group at each level. However, the description may still generally be applied where multiple groups exist at a level where each of the collapsed conditions is understood as being associated with one of the levels and having a range for each group of policy conditions found at that level. Thus, rather than considering each group as having an associated collapsed condition for each level which is compared to a corresponding one of a plurality of collapsed conditions for that level, the collapsed condition itself may be defined as a singular condition having a plurality of ranges, each of which must be met for the collapsed condition for that level to be met.

Figure 6:
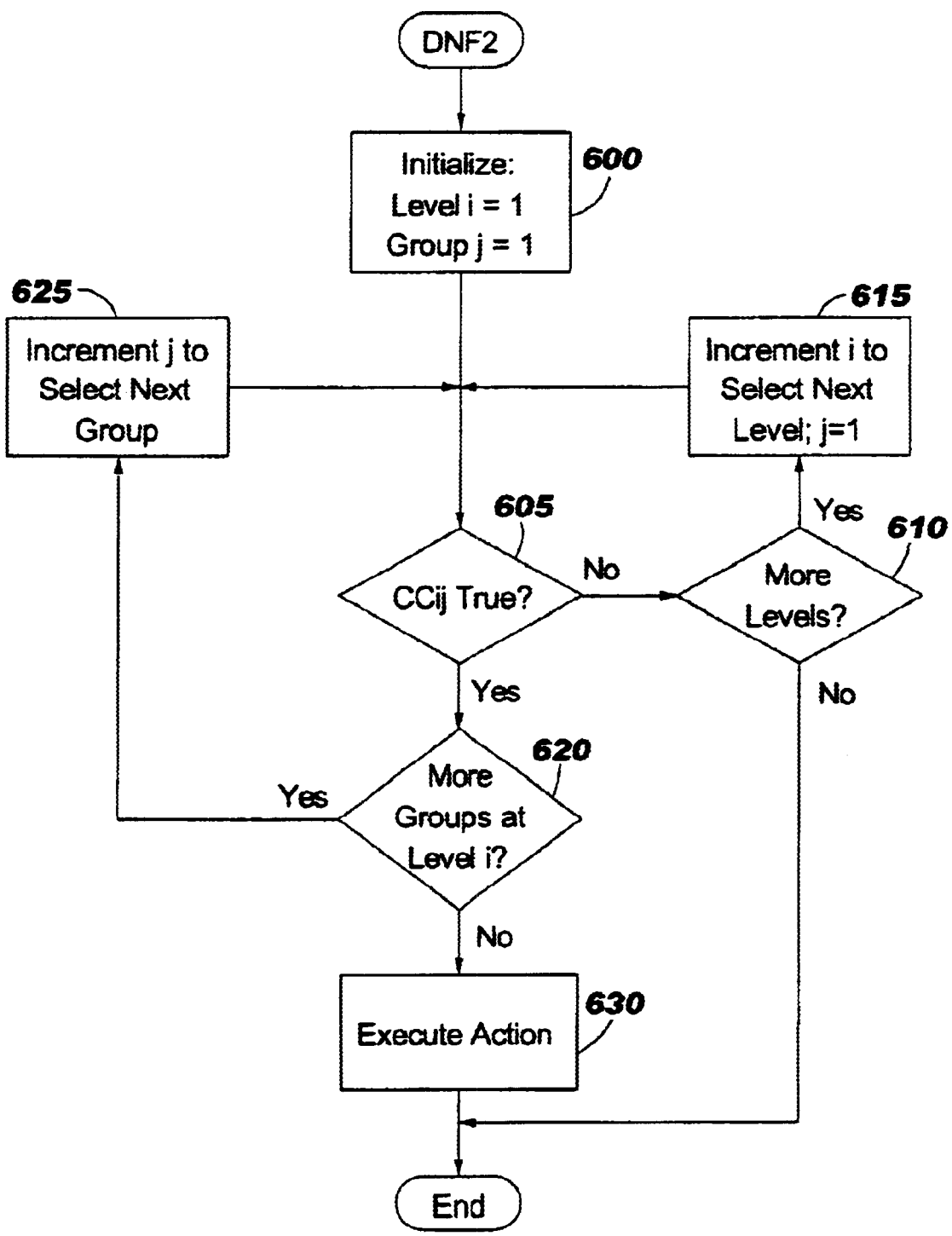
FIG. 6 is a flowchart illustrating DNF rule processing operations according to embodiments of the present invention.

Referring now to FIG. 6 and with an understanding of the terminology related to collapsed conditions for a level described in the last paragraph, operations related to detecting a collapsed condition to determine if it is met will now be described. Referring first to block 600 an initial collapsed condition for a particular level i and group j is selected (illustrated as initializing i, j to 1, 1 in FIG. 6). If the selected collapsed condition for that group at that level is met (block 605) it is determined if there are any further groups included at the first selected level (block 620). If there are further groups at that level (block 620), the next group at that level is selected (block 625) and operations at blocks 605 and 620 continue. If there are no more groups at the respective level (block 620), indicating that all of the ranges within the collapsed condition for that level have been met, the action associated with the complex policy rule is executed (block 630).

If any group's collapsed condition within the level being tested is not met (block 605), it is determined if there are further levels which have not yet been tested (block 610). If no further levels remain to be tested (block 610) it is determined that the associated action for the complex policy rule need not be executed and operations with respect to that candidate policy rule cease. If additional levels remain which have not yet been tested (block 610), a next level is selected (block 615) and operations continue as described previously with reference to blocks 605, 610, 620 and 625.

Operations for processing CNF type complex type policy rules according to various embodiments of the present invention will now be described with reference to the embodiments illustrated in FIG. 7. Note that FIG. 7 will be described with reference to operations without addressing different groups being included within individual levels. However, operations will be further described with reference to various embodiments as illustrated in FIG. 8 showing processing of individual groups within the respective levels where a plurality of groups are found at different levels.

Figure 7:
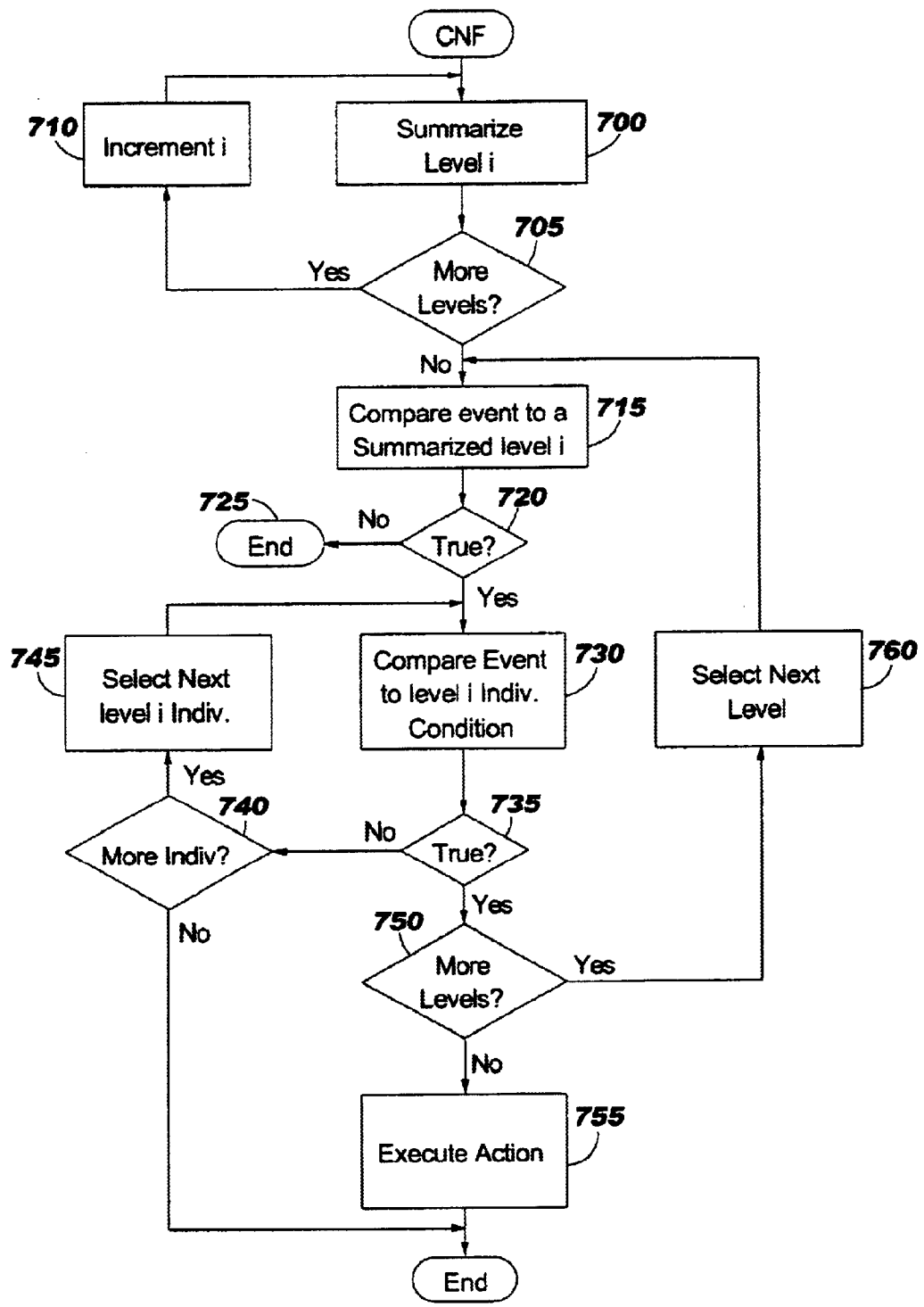
FIG. 7 is a flowchart illustrating CNF rule processing operations according to embodiments the present invention.
Figure 8:
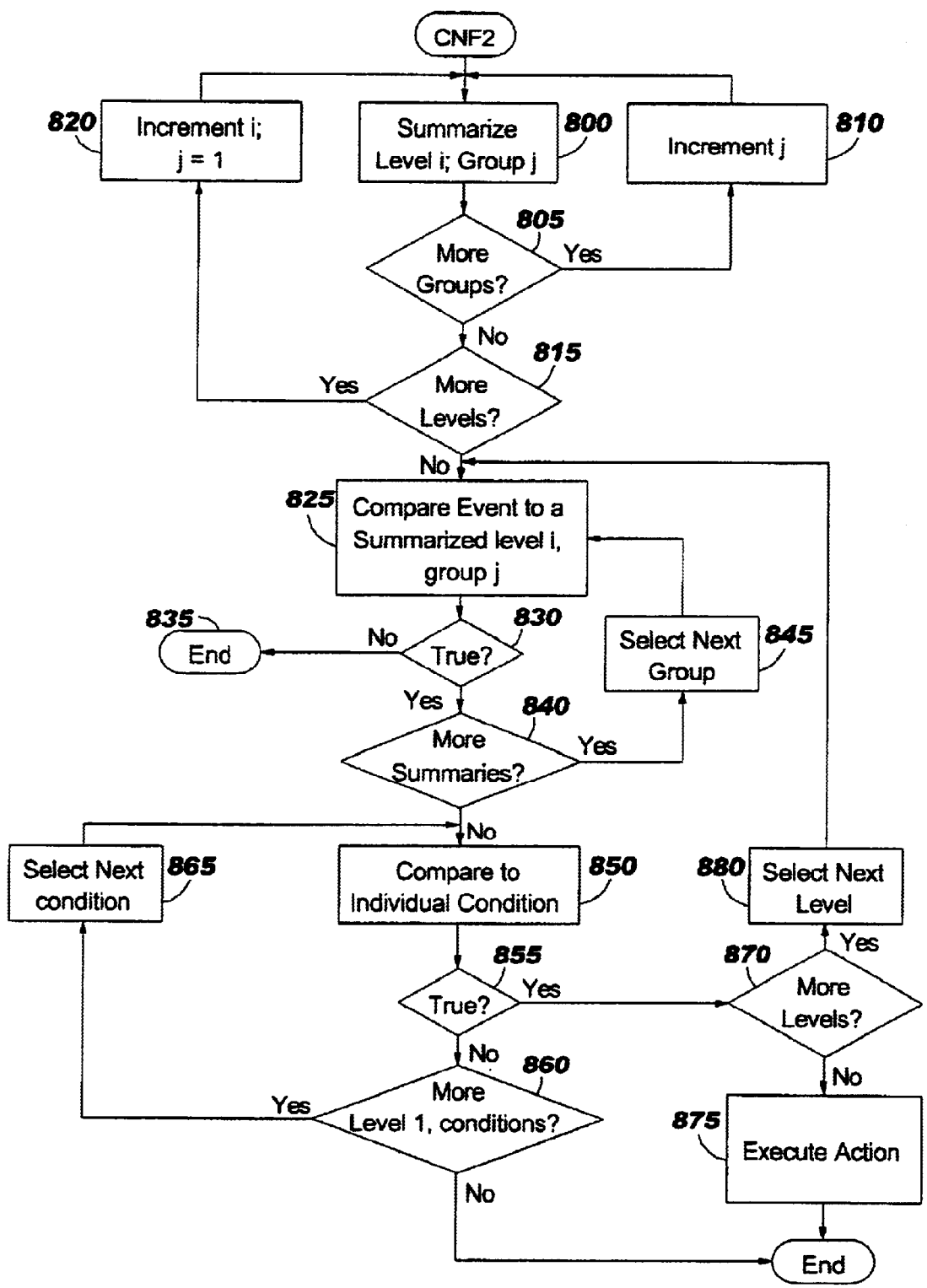
FIG. 8 is a flowchart illustrating CNF rule processing operations according to embodiments of the present invention.

As shown in FIG. 7, operations begin at block 700 by summarizing the individual conditions at a first level (i) to generate a summary condition for that level. If more levels remain for the complex policy rule (block 705), a next level is selected (shown as incrementing the counter in FIG. 7) (block 710) and operations return to block 700.

If no more levels remain to be summarized (block 705), an event being tested against the candidate complex policy rule is compared to a selected one of the summary conditions to determine if the selected summary condition is met (block 715). If the selected summarized condition is not met (block 720), operations for that candidate complex policy rule cease and the associated action is not executed (block 725).

Operations where the summary condition is met (block 720) will now be further described with reference to embodiments in which testing of individual conditions at a level having a successfully tested summary condition proceed before testing summary conditions at other ones of the levels of the candidate complex policy rule. However, it is to be understood that, in keeping with the present invention, summary conditions from each of the levels may be tested before initiating testing operations on individual conditions at respective levels. Alternatively, such evaluations of summary conditions should be accomplished in parallel followed by evaluation of individual conditions, serially or in parallel, if no summary condition was not met.

For the embodiments illustrated in FIG. 7, when a summarized condition at a level is met (block 720) the event is compared to one of the individual policy conditions associated with the same level as the summary condition which was met (block 730). If the selected individual condition is not met (block 735) and there are no more individual conditions at that level (block 740) it is determined that the action associated with the candidate complex policy rule should not be executed and operations for that candidate complex policy rule will cease. If the individual policy condition is not met (block 735), but more individual policy conditions remain to be tested at that level (block 740), a next individual condition from that level is selected (block 745) and operations return to block 730. Thus, each of the individual policy conditions associated with the same level as the summary condition which was met is tested to determine if any of the individual policy conditions associated with that level are met.

If one of the individual policy conditions for a level is met (block 735) and more levels remain to be tested (block 750), a next level is selected (block 760) and operations return to block 715. A summary condition associated with the next selected level may then be compared to the event at block 715 to determine if it is met followed by testing of the candidate individual policy conditions for the next level at blocks 730–745 as described previously. If no more levels remain to be tested at block 750, the action associated with the candidate policy rule is executed (block 755).

Thus, operations as described with reference to blocks 715–750 repeat until one of the individual policy conditions for each level is met and the associated action is executed at block 755 or either one of the summary conditions is not met or all of the individual policy conditions for one of the levels are not met, in which case the associated action for the candidate complex policy rule is not executed. Operations may cease in processing the candidate complex policy rule as soon as either of the failure conditions is encountered without the need to continue S operations for individual conditions which have not yet been tested.

Note that, the sequence of operations may alternatively proceed through a plurality of summary conditions before moving to individual conditions by selecting the summary condition for successive levels until either: one of the summary conditions is not met, or all of the summary conditions are met. If all of the summary conditions are met, operations may then continue by testing individual policy conditions until either: all individual policy conditions for one of the levels are not met, or at least one of the individual policy conditions for each level is met.

Operations related to processing of a CNF type complex policy rule including a plurality of different groups at each level will now be further described with reference to FIG. 8 for various embodiments of the present invention. For the purposes of the description of FIG. 8, it is to be understood that each of a plurality of individual policy conditions associated with a complex policy rule includes a plurality of groups with the individual policy conditions being expressed as ranges for each of the groups. Furthermore, as with the discussion of the term "range" above, individual policy conditions having a single value for a particular group will be understood as having a unitary value range for that group and individual policy conditions having no limitation based on a particular group will be considered as having an all inclusive range for such group.

Operations for generating summarized conditions for each level in each group at each level will now be described with reference to blocks 800–815 of FIG. 8. A first summarized condition is generated for a first group (j) at a first level (i) at block 800. If more groups remain (block 805), a next group is selected (block 810) and operations return to block 800. Similarly, if more levels remain (block 815) a next level is selected (block 820) and operations return to block 800. Note that, while the sequence of generating summary conditions is illustrated in FIG. 8 as proceeding through each group at a level and then through subsequent levels, the present invention is not so limited and the summary conditions may be generated in a variety of ways, such as all levels for each group, or a mixture of the two.

In any event, a respective one of the associated values for the event being tested is compared to an associated selected one of the summary conditions (block 825). The selected one of the summary conditions is associated with the same group of policy conditions as the respective one of the associated values for the event being tested. For example, a destination device IP address range from a condition may be compared to the destination device IP address associated with the received communication packet and so on. If the tested one of the summary conditions is not met (block 830) it is determined that the candidate complex policy rule may be skipped and operations cease (block 835).

If the summarized condition is met (block 830), it is determined if there are other groups at the level to be tested to determine if all summary conditions for the level are met (block 840), and, if so, a next group is selected (block 845) and operations return to block 825. If all of the group's summarized ranges for the summarized conditions at the level being tested are met (block 840) then operations proceed related to testing of individual conditions at that level as will be described with reference to blocks 850–865.

Individual policy conditions associated with the same level as the tested summary condition which is met are tested to determine if any of the individual policy conditions associated with the same level as the tested summary condition are met. Such operations for a level including a plurality of groups will now be described. A first selected individual condition is compared to the event under test to determine if it is met (block 850).

Assuming for purposes of this description that, as specified in the IETF proposal, a plurality of groups in an individual condition are expressed in AND form to be met, the summarized range for each of the groups included in the individual condition under test must be met. Should the association between groups of an individual condition be in another form, the benefits of the present invention may still be obtained by first reducing the individual conditions to an ANDed form and structuring the complex policy rule in either a CNF or DNF form with all of the individual conditions being expressed in an ANDed form. It will be understood by those of ordinary skill in the art how to structure policy conditions in such a form for evaluation in accordance with the teachings of the present invention.

If the tested individual condition from block 850 is not met (block 855) and no further individual conditions remain to be tested for that level (block 860), in other words, all the individual conditions have not been met for a level, it is determined that the associated action for the candidate complex policy rule should not be executed and operations with respect to that candidate complex policy rule may cease. If more individual conditions remain to be tested at that level (block 860), a next individual condition from that level is selected (block 865) and operations return to block 850.

Once it is determined that one of the individual conditions is met (block 855), it is determined if any more levels remain to be tested (block 870). If no levels remain to be tested (block 870), then the action associated with the complex policy rule is executed (block 875). If additional levels remain to be tested (block 870), a next level is selected (block 880) and operations return to block 825.

Operations related to various embodiments which may provide for quick evaluation of a complex policy rule to see if further evaluation is necessary to determine if the policy rule applies to a current event under test (such as an inbound/outbound data packet or a connection request) will now be further described with reference to the embodiments illustrated in FIGS. 9A–9C. Consistent with the terminology used previously, the exemplary embodiments shown in FIGS. 9A–9C will be described using a notation in which a complex rule has one or more levels of conditions, which conditions are represented as Cx.y where x is the level and y is the relative individual condition within a level. Note that, in contrast with such a complex policy rule, a simple rule would have all the group attributes, such as host-conditions, routing-conditions, application-conditions, etc., defined as part of the rule. A simple rule will be noted in the figures as C0.

Figure 9A:
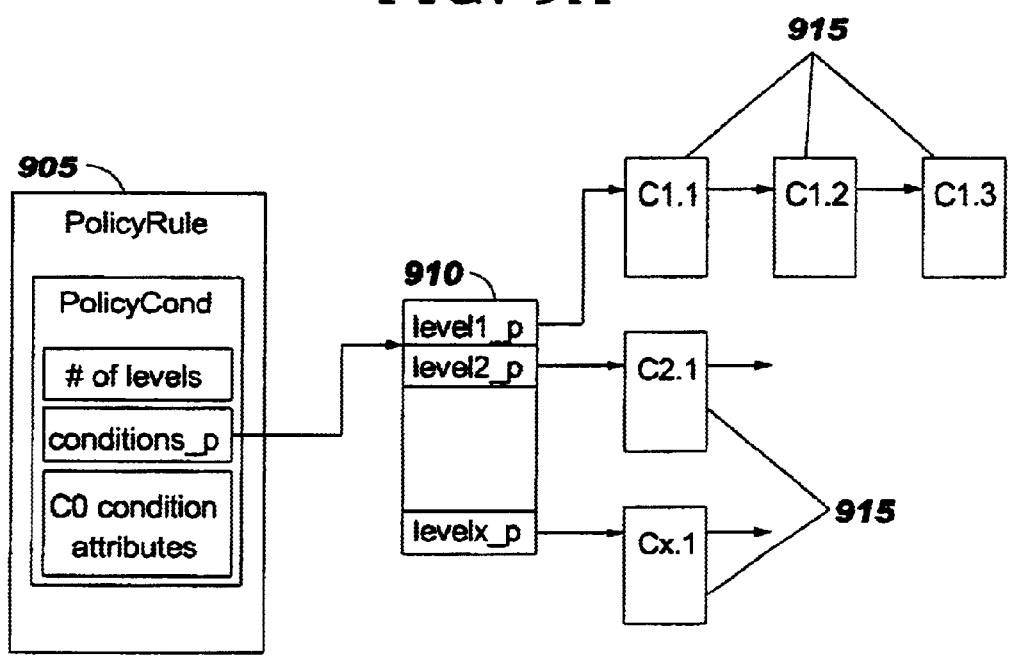
FIG. 9A is a block diagram illustrating a policy rule structure which may be used to represent either a simple rule or a complex rule.

FIG. 9A is a block diagram illustrating how simple and complex rules may be represented. As shown in FIG. 9A, a simple rule would have a "# of levels" field value of 0 in policy Rule 905 and all policy condition groups would be contained within register "C0 condition attributes" of the policy Rule 905. Thus, the "conditions_p" field would be a null set.

For a complex policy rule where the number of levels is greater than 0, the conditions_p field of the policy Rule 905 will point to a separate multiple entry register 910 indexing to the policy conditions for each level. Thus, for a complex policy rule, the conditions_p field of the policy Rule 905 is a non-null pointer to the register 910. Each level is figuratively illustrated in the register 910 as a row corresponding to a level (i.e., to the x in the Cx.y). Further note that each condition Cx.y, indicated by the reference numeral 915 in FIG. 9A, will typically contain a plurality of different groups, each group having an associated range where the individual condition is defined by the AND of the respective parameter ranges.

Operations for DNF type complex policy rule processing using this format will now be described with reference to FIG. 9B for various embodiments of the present invention. For each level of the complex policy rule, a collapsed condition is generated. If a collapsed condition cannot be obtained, for example, if ranges of the same group do not intersect across individual conditions of a level, the complex policy rule may be declared invalid. Assuming no invalid conditions are encountered, at the end of generation of the collapsed conditions, there will be x collapsed conditions, one for each level. Note that, assuming each level contains y groups, there will be a total of x times y collapsed ranges with y ranges associated with each of the x collapsed conditions. Thus, the number of conditions in going from individual conditions to collapsed conditions is reduced to x instead of x times y. Each collapsed condition is shown in FIG. 9B by the notation CCi where i ranges from 1 to x and represents the corresponding level.

Figure 9B:
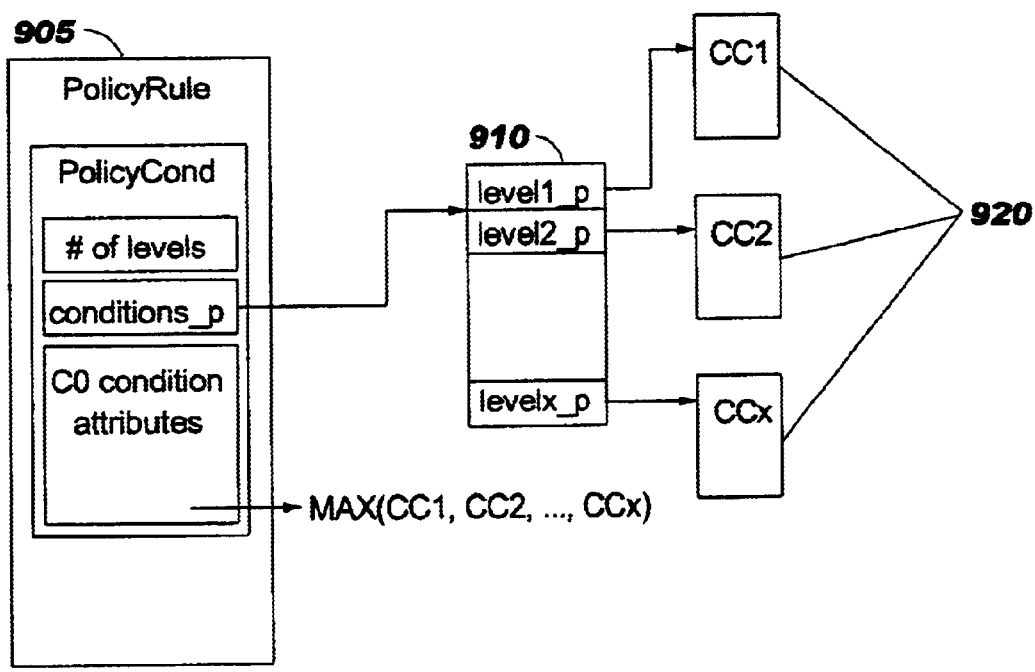
FIG. 9B is a block diagram illustrating a structure for processing a DNF type complex policy rule.
Figure 9C:
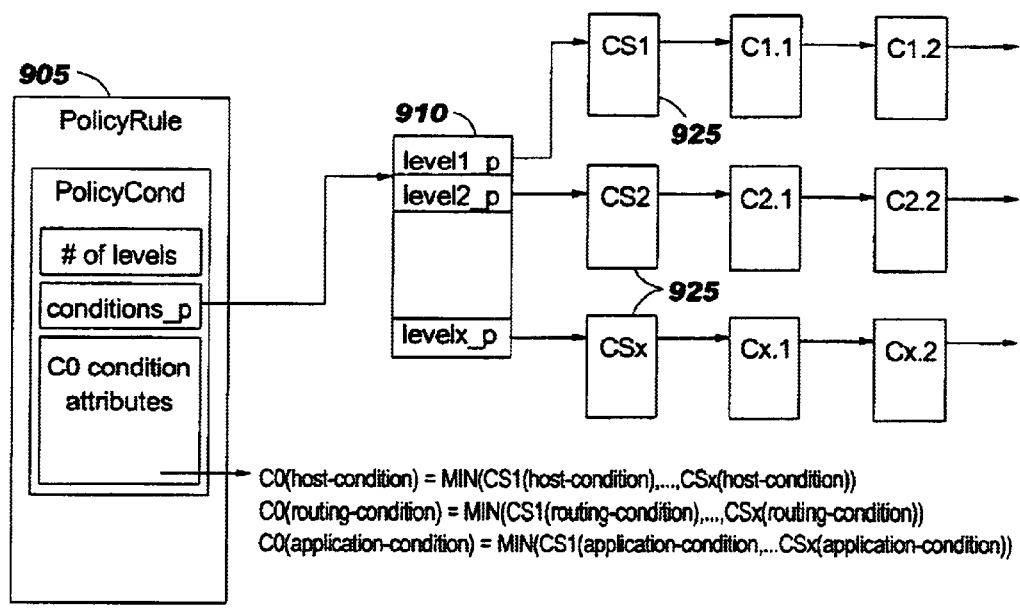
FIG. 9C is a block diagram illustrating a structure for processing a CNF type complex policy rule.

One of the collapsed conditions, for example the most likely to be met collapsed condition (which will be referred to herein as the "largest" condition), is then placed into the "C0 condition attributes" register of the policy Rule 905 as shown by the function "MAX(CC1, CC2, ..., CCx)" in FIG. 9B. For the structure illustrated in FIGS. 9A–9C, a policy rule may be mapped to an event by comparing respective ones of the event's characteristics (i.e., the "point" in space values associated with the event) with the condition contained in the "C0 condition attributes" register of the policy Rule 905. Further note that, as each collapsed condition may have a plurality (y) of ranges and the associated corresponding values of an event being mapped may have a corresponding number of values, the register "C0 condition attributes" will typically include a plurality of ranges with one range for each of the y groups to be compared with the associated characteristics of an event being tested.

If the evaluation of the event against the collapsed condition in the register "C0 condition attributes" results in a TRUE (the conditions are met), the corresponding action of the policy rule can be executed. Otherwise, the remaining collapsed conditions CCi are evaluated. The first comparison of an event to a collapsed condition which results in a TRUE condition enables the policy rule associated action to be executed. In various embodiments of the present invention, the "largest" condition is placed in C0 first to potentially increase the probability that its evaluation will result in a TRUE condition, thus allowing the associated actions of the candidate complex policy rule to be executed and operations to move on to a next required event or candidate policy rule without further testing of remaining collapsed conditions.

Operations for processing a CNF type complex policy rule in accordance with various embodiments of the present invention will now be further described with reference to FIG. 9C. For each level i of policy conditions, a summarized condition is obtained to represent that level. Note that, as with FIG. 9B, each summarized condition 925 will typically contain a plurality of ranges associated with the various groups (y) found at that level. Thus, each summarized condition 925 contains the superset OR of each condition group (such as host-condition, routing-conditions and application-condition) of the individual conditions 915 for that level.

In various embodiments, the superset OR summarized condition may include a gap between two ranges of a condition attribute. For example, if C1.1 has a source port range of 20-21 and C1.2 has a source port range of 80-80 (i.e., a unitary value), the summarized condition will contain a source port range of 20-80. This summarized range covers the source port range from 22-79 which does not belong to any of the individual conditions. By way of further example, if individual condition C1.1 has a source port range of 20-21 and a source address range of 9.37.80.1-9.37.80.128 and C1.2 has a source port range of 21-22 and a source address range of 9.37.80.50-9.37.80.254, the summarized condition will contain a source port range of 20-22 and a source address range of 9.37.80.1-9.37.80.254. Thus, if an inbound data event occurs with a source port of 20 and a source address of 9.37.80.200, evaluation of the summarized condition will provide a TRUE yet, when evaluating the individual condition C1.1 and C1.2, the result for each will be FALSE. Thus, the purpose for the testing of individual conditions where summarized conditions were met as described previously and as will be explained further herein with reference to particular examples. Note that the summarized condition at each level i is shown in FIG. 9C as "CSi" and each group within the summarized condition is noted in the "C0 condition attributes" register associated logic equations and, further, below, as CSi (host-condition), CSi (routing-condition), and CSi (application-condition) respectively.

As shown by the equations for the "C0 condition attributes" register expressed below, the smallest of each group in each summarized condition is placed in the "C0 condition attributes" register as follows:

C0(host-condition)=MIN (CS1(host-condition), CS2 (host-condition), . . . CSx(host-condition))

C0(routing-condition)=MIN (CS1(routing-condition), CS2(routing-condition), . . . (CSx(routing-condition))

C0(application-condition)=MIN(CS1(application-condition), CS2(application-condition), . . . CSx (application-condition))

During mapping of a policy rule to an event, as described with reference to DNF operations, the event is compared with the conditions in the "C0 condition attributes" register. If the evaluation results in a FALSE, the policy rule can be skipped and processing may continue with the next policy rule. If the evaluation results in a TRUE condition, then operations continue with further evaluation of the levels of the policy rule. The actions associated with the policy rule may be executed if all levels are evaluated to TRUE while the rule may be immediately and automatically skipped if evaluation of any one level results in a FALSE condition. This is why the "smallest" (i.e., most likely to not be met) condition of each group of the summarized condition may be initially placed in the "C0 condition attributes" register for various embodiments of the present invention as this may facilitate skipping a rule more quickly.

As with the term "largest" above, the term "smallest" in the CNF context may refer to the categorized condition group having the narrowest range of values or other characteristic which would indicate a greater likelihood of not being met based on the particular application environment in which the present invention is implemented. Note that, in contrast with the DNF structure described with reference to FIG. 9B, the CNF conditions illustrated in FIG. 9C may provide for keeping the summarized condition for each level for quick evaluation of each level to see if the evaluation is FALSE. If the evaluation is FALSE, the process can automatically continue to a next policy rule while continuing operations if the evaluation is TRUE.

In further embodiments of the present invention, other specific operations may be provided for certain conditions. For example, with respect to DNF type processing, if each individual level has only one collapsed condition which contains a specification for a specific group (such as host-condition or routing-condition or application-condition, etc.) and none of the collapsed conditions contains the same group (in other words, each level contains one group), each group can be put in the C0 condition attributes register accordingly. Thus, the minimization operation becomes unnecessary. The number of level in the policy rule may then be 0. The same applies to the CNF type policy rule under the same circumstances except that it is the MAX condition operation which may be obviated.

The flowcharts and block diagrams of FIGS. 1 through 8 and 9A through 9C illustrate the architecture, functionality, and operation of possible implementations of systems, methods and computer program products for processing complex rules according to the present invention. In this regard, each block in the flow charts or block diagrams represents a module, segment, or portion of code, which comprises one or more executable instructions for implementing the specified logical function(s). It should also be noted that in some alternative implementations, the functions noted in the blocks may occur out of the order noted in the figures. For example, two blocks shown in succession may in fact be executed substantially concurrently or the blocks may sometimes be executed in the reverse order, depending upon the functionality involved.

In the drawings and specification, there have been disclosed typical preferred embodiments of the invention and, although specific terms are employed, they are used in a generic and descriptive sense only and not for purposed of limitation, the scope of the invention being set forth in the following claims.

That which is claimed:

1. A method for processing a complex policy rule structured in a plurality of levels wherein the complex policy rule selects an action for execution based on a plurality of individual policy conditions each of the individual policy conditions being expressed as ranges and being associated with one of the levels, the method comprising the steps of:

determining if the complex policy rule is a conjunctive normal form (CNF) policy rule;

receiving an event, the event having an associated value defining a point in a space covered by the individual policy conditions; and performing the following steps if the complex policy rule is a CNF policy rule:

generating a plurality of summary conditions, each of the summary conditions being associated with one of the levels;

comparing the associated value of the received event to a selected one of the summary conditions to determine if the selected one of the summary conditions is met;

determining that the complex policy rule may be skipped if the selected one of the summary conditions is not met;

repeating the step of comparing for others of the summary conditions and individual policy conditions until at least one of one of the summary conditions is not met, all individual policy conditions for one of the levels are not met or at least one of the individual policy conditions for each level is met; and determining that the complex policy rule may be skipped if at least one of one of the summary conditions is not met or all individual policy conditions for one of the levels are not met.

2. The method of claim 1 wherein the step of repeating the step of comparing for others of the summary conditions and individual policy conditions until at least one of one of the summary conditions is not met, all individual policy conditions for one of the levels are not met or at least one of the individual policy conditions for each level is met further comprises the steps of:

comparing the associated value of the received event to ones of the individual policy conditions associated with a same level as the selected one of the summary conditions if the selected one of the summary conditions is met to determine if any of the individual policy conditions associated with a same level as the selected one of the summary conditions is met;

selecting another one of the summary conditions associated with another one of the levels and comparing the associated value of the received event to the another one of the summary conditions to determine if the another one of the summary conditions is not met;

comparing the associated value of the received event to ones of the individual policy conditions associated with the another one of the levels if the another one of the summary conditions is met to determine if any of the individual policy conditions associated with the another one of the levels is met; and repeating the steps of selecting another one of the summary conditions associated with another one of the levels and comparing the associated value of the received event to the another one of the summary conditions and comparing the associated value of the received event to ones of the individual policy conditions associated with the another one of the levels if the another one of the summary conditions is met until at least one of one of the summary conditions is not met, all individual policy conditions for one of the levels are not met or at least one of the individual policy conditions for each level is met.

3. The method of claim 1 wherein the step of repeating the step of comparing for others of the summary conditions and individual policy conditions until at least one of one of the summary conditions is not met, all individual policy conditions for one of the levels are not met or at least one of the individual policy conditions for each level is met further comprises the steps of:

selecting another one of the summary conditions associated with another one of the levels and comparing the associated value of the received event to the another one of the summary conditions to determine if the another one of the summary conditions is not met;

repeating the step of selecting another one of the summary conditions for others of the summary conditions until at least one of one of the summary conditions is not met or all of the summary conditions are met; and comparing the associated value of the received event to individual policy conditions until at least one of all individual policy conditions for one of the levels are not met or at least one of the individual policy conditions for each level is met if all of the summary conditions are met.

4. The method of claim 1 further comprising the step of executing the action associated with the complex policy rule if at least one individual policy condition at each level is met if the complex policy rule is a CNF policy rule.

5. The method of claim 4 wherein the step of generating a plurality of summary conditions further comprises the step of establishing a lowest starting value of one of the individual conditions associated with a level as a start value of a summary condition for that level and establishing a highest ending value of one of the individual policy conditions associated with that level as an end value of the summary condition for that level.

6. The method of claim 5 wherein the step of generating a plurality of summary conditions further comprises the step of generating an all inclusive range as a summary condition for a level if the associated range of one of the individual policy conditions associated with that level is a unitary point of a first value and another of the individual policy conditions associated with that level is a unitary point of a second value different from the first value.

7. The method of claim 6 wherein the step of generating a plurality of summary conditions further comprises the step of generating an all inclusive range as a summary condition for a level if the associated range of one of the individual policy conditions associated with that level is all inclusive.

8. The method of claim 4 wherein the step of comparing the associated value of the received event to an associated selected one of the summary conditions is preceded by the step of selecting one of the summary conditions most likely to not be met as the selected one of the summary conditions.

9. The method of claim 4 further comprising the steps of:

determining if the complex policy rule is a disjunctive normal form (DNF) policy rule; and performing the following steps if the complex policy rule is a DNF policy rule:

generating a plurality of collapsed conditions, each of the collapsed conditions being associated with one of the levels and having a range for each group of policy conditions included in the one of the plurality of levels;

comparing the associated value of the received event to a selected one of the collapsed conditions to determine if the selected one of the collapsed conditions is met;

selecting another one of the collapsed conditions and comparing the associated value of the received event to the selected another one of the collapsed conditions to determine if the selected another one of the collapsed conditions is met if the selected one of the collapsed conditions is not met;

repeating the steps of comparing until at least one of a collapsed condition is met or all of the collapsed conditions are not met; and wherein the step of executing the action further comprises the step of executing the action associated with the complex policy rule if one of the collapsed conditions is met if the complex policy rule is a DNF policy rule.

10. A method for processing a complex policy rule structured in a plurality of levels wherein the complex policy rule selects an action for execution based on a plurality of individual policy conditions, each of the individual policy conditions including a plurality of groups and being expressed as ranges for each of the groups, the method comprising the steps of:

determining if the complex policy rule is a conjunctive normal form (CNF) policy rule;

receiving an event, the event having associated values defining a point in a space covered by the plurality of conditions; and performing the following steps if the complex policy rule is a CNF policy rule:

generating a plurality of summary conditions, each of the summary conditions being associated with a respective one of the groups for a respective one of the levels;

comparing a respective one of the associated values of the received event to an associated selected one of the summary conditions, the selected one of the summary conditions being associated with the same group of policy conditions as the respective one of the associated values of the received event, to determine if the associated one of the summary conditions is met;

determining that the complex policy rule may be skipped if the associated one of the summary conditions is not met;

repeating the step of comparing for others of the summary conditions and individual policy conditions until at least one of one of the summary conditions is not met, all individual policy conditions for one of the levels are not met or at least one of the individual policy conditions for each of the levels is met;

determining that the complex policy rule may be skipped if at least one of one of the summary conditions is not met or all individual policy conditions for one of the levels are not met; and executing the action if at least one of the individual policy conditions for each of the levels is met if the complex policy rule is a CNF policy rule.

11. The method of claim 10 wherein at least one of the groups is selected from the group consisting of source device internet protocol (IP) address range, destination device IP address range, inbound interface identifier (ID) range, outbound interface ID range, source device port number range, destination device port number range, protocol ID range, application name and application data classification.

12. The method of claim 10 wherein the step of generating a plurality of summary conditions further comprises the step of establishing a lowest starting value of one of the groups of one of the individual conditions associated with a level as a start value of a summary condition for that group for that level and establishing a highest ending value of the one of the groups of the one of the individual policy conditions associated with that level as an end value of the summary condition for that group for that level.

13. The method of claim 12 wherein the step of generating a plurality of summary conditions further comprises the step of generating an all inclusive range as a summary condition for a group for a level if the associated range for that group of one of the individual policy conditions associated with that level is a unitary point of a first value and another of the individual policy conditions associated with that level for that group is a unitary point of a second value different from the first value.

14. The method of claim 13 wherein the step of generating a plurality of summary conditions further comprises the step of generating an all inclusive range as a summary condition for a group for a level if the associated range for that group of one of the individual policy conditions associated with that level is all inclusive.

15. The method of claim 10 wherein the step of comparing a respective one of the associated values of the received event is preceded by the step of selecting one of the summary conditions most likely to not be met as the selected one of the summary conditions.

16. The method of claim 10 further comprising the steps of:

determining if the complex policy rule is a disjunctive normal form (DNF) policy rule; and performing the following steps if the complex policy rule is a DNF policy rule:

generating a plurality of collapsed conditions, each of the collapsed conditions being associated with one of the levels and having a range for each group of policy conditions;

comparing the associated values of the received event to a selected one of the collapsed conditions to determine if the selected one of the collapsed conditions is met;

selecting another one of the collapsed conditions and comparing the associated values of the received event to the selected another one of the collapsed conditions to determine if the selected another one of the collapsed conditions is met if the previously selected one of the collapsed conditions is not met;

repeating the step of selecting another one of the collapsed conditions and comparing the associated values of the received event to the selected another one of the collapsed conditions until at least one of a collapsed condition is met or all of the collapsed conditions are not met; and wherein the step of executing the action further comprises the step of executing the action associated with the complex policy rule if one of the collapsed conditions is met if the complex policy rule is a DNF policy rule.

17. The method of claim 16 wherein the steps of comparing the associated values of the received event to a selected one of the collapsed conditions to determine if the selected one of the collapsed conditions is met and selecting another one of the collapsed conditions and comparing the associated values of the received event to the selected another one of the collapsed conditions to determine if the selected another one of the collapsed conditions is met if the previously selected one of the collapsed conditions is not met further comprise the step of determining that a collapsed condition is not met if any one of the ranges of the collapsed condition is not met.

18. The method of claim 10 wherein the step of repeating the step of comparing for others of the summary conditions and individual policy conditions comprises the step of comparing the associated values of the received event to ones of the individual policy conditions associated with the same level as one of the summary conditions which is met to determine if any of the individual policy conditions associated with the same level as one of the summary conditions which is met are met.

19. The method of claim 10 wherein the step of repeating the step of comparing for others of the summary conditions and individual policy conditions comprises the steps of:

selecting another one of the summary conditions associated with the same level as the selected one of the summary conditions and associated with a different group of policy conditions;

comparing one of the associated values of the received event associated with the different group to the another one of the summary conditions to determine if the another one of the summary conditions is met; and repeating the steps of selecting another one of the summary conditions and comparing one of the associated values of the received event associated with the different group to the another one of the summary conditions until at least one of a summary condition is not met or all of the summary conditions associated with the same level are met.

20. The method of claim 19 wherein the step of repeating the steps of selecting another one of the summary conditions and comparing one of the associated values of the received event associated with the different group to the another one of the summary conditions is followed by the step of comparing the associated values of the received event to ones of the individual policy conditions associated with the same level to determine if any of the individual policy conditions associated with the same level are met if all of the summary conditions associated with the same level are met.

21. The method of claim 20 wherein the step of comparing the associated values of the received event to ones of the individual policy conditions associated with the same level to determine if any of the individual policy conditions associated with the same level are met if all of the summary conditions associated with the same level are met is followed by the steps of:

comparing the associated values of the received event to ones of the summary conditions associated with another one of the levels to determine if any of the summary conditions associated with another one of the levels is not met;

comparing the associated values of the received event to ones of the individual policy conditions associated with the another one of the levels if all of the ones of the summary conditions associated with the another one of the levels is met to determine if any of the ones of the individual policy conditions associated with the another one of the levels are met; and repeating the steps of comparing the associated values of the received event to ones of the summary conditions associated with another one of the levels and comparing the associated values of the received event to ones of the individual policy conditions associated with the another one of the levels for others of the plurality of levels until at least one of the summary conditions is not met, all individual policy conditions for one of the levels are not met or at least one of the individual policy conditions for each level is met.

22. The method of claim 21 wherein at least one of the groups is selected from the group consisting of source device internet protocol (IP) address range, destination device IP address range, inbound interface identifier (ID) range, outbound interface ID range, source device port number range, destination device port number range, protocol ID range, application name and application data classification.

23. The method of claim 22 wherein the step of generating a plurality of summary conditions further comprises the step of establishing a lowest starting value of one of the groups of one of the individual conditions associated with a level as a start value of a summary condition for that group for that level and establishing a highest ending value of the one of the groups of the one of the individual policy conditions associated with that level as an end value of the summary condition for that group for that level.

24. The method of claim 23 wherein the step of generating a plurality of summary conditions further comprises the step of generating an all inclusive range as a summary condition for a group for a level if the associated range for that group of one of the individual policy conditions associated with that level is a unitary point of a first value and another of the individual policy conditions associated with that level for that group is a unitary point of a second value different from the first value.

25. The method of claim 24 wherein the step of generating a plurality of summary conditions further comprises the step of generating an all inclusive range as a summary condition for a group for a level if the associated range for that group of one of the individual policy conditions associated with that level is all inclusive.

26. The method of claim 25 further comprising the steps of:
determining if the complex policy rule is a disjunctive normal form (DNF) policy rule; and
performing the following steps if the complex policy rule is a DNF policy rule:
generating a plurality of collapsed conditions, each of the collapsed conditions being associated with one of the levels and having a range for each group of policy conditions;
comparing the associated values of the received event to a selected one of the collapsed conditions to determine if the selected one of the collapsed conditions is met;
selecting another one of the collapsed conditions and comparing the associated values of the received event to the selected another one of the collapsed conditions to determine if the selected another one of the collapsed conditions is met if the previously selected one of the collapsed conditions is not met;
repeating the step of selecting another one of the collapsed conditions and comparing the associated values of the received event to the selected another one of the collapsed conditions until at least one of a collapsed condition is met or all of the collapsed conditions are not met; and
wherein the step of executing the action further comprises the step of executing the action associated with the complex policy rule if one of the collapsed conditions is met if the complex policy rule is a DNF policy rule.

27. The method of claim 26 further comprising the step of selecting one of the plurality of collapsed conditions which is most likely to be met as the selected one of the plurality of collapsed conditions.

28. The method of claim 27 wherein the step of generating a plurality of collapsed conditions further comprises the step of establishing an intersection of associated ranges of all individual policy conditions associated with each group of policy conditions included in a particular level to provide one of the plurality of collapsed conditions associated with the particular level.

29. A method for processing a complex policy rule structured in a plurality of levels wherein the complex policy rule selects an action for execution based on a plurality of individual policy conditions each of the individual policy conditions being expressed as ranges and being associated with one of the levels, the method comprising the steps of:
receiving an event, the event having an associated value defining a point in a space covered by the individual policy conditions;
determining if the complex policy rule is a disjunctive normal form (DNF) policy rule; and
performing the following steps if the complex policy rule is a DNF policy rule:
generating a plurality of collapsed conditions, each of the collapsed conditions being associated with one of the levels and having a range for each group of policy conditions included in the one of the plurality of levels;
comparing the associated value of the received event to a selected one of the collapsed conditions to determine if the selected one of the collapsed conditions is met;
selecting another one of the collapsed conditions and comparing the associated value of the received event to the selected another one of the collapsed conditions to determine if the selected another one of the collapsed conditions is met if the selected one of the collapsed conditions is not met;
repeating the steps of comparing until at least one of a collapsed condition is met or all of the collapsed conditions are not met; and
executing the action associated with the complex policy rule if one of the collapsed conditions is met if the complex policy rule is a DNF policy rule.

30. A system for processing a complex policy rule structured in a plurality of levels wherein the complex policy rule selects an action for execution based on a plurality of individual policy conditions each of the individual policy conditions being expressed as ranges and being associated with one of the levels, the system comprising:
means for determining if the complex policy rule is a conjunctive normal form (CNF) policy rule;

means for receiving an event, the event having an associated value defining a point in a space covered by the individual policy conditions; and the following means responsive to determining that the complex policy rule is a CNF policy rule:

means for generating a plurality of summary conditions, each of the summary conditions being associated with one of the levels;

means for comparing the associated value of the received event to a selected one of the summary conditions to determine if the selected one of the summary conditions is met;

means for determining that the complex policy rule may be skipped if the selected one of the summary conditions is not met;

means for controlling the means for comparing to repeat comparing for others of the summary conditions and individual policy conditions until at least one of one of the summary conditions is not met, all individual policy conditions for one of the levels are not met or at least one of the individual policy conditions for each level is met; and means for determining that the complex policy rule may be skipped if at least one of one of the summary conditions is not met or all individual policy conditions for one of the levels are not met.

31. The system of claim 30 wherein the means for controlling the means for comparing further comprises:

means for comparing the associated value of the received event to ones of the individual policy conditions associated with a same level as the selected one of the summary conditions if the selected one of the summary conditions is met to determine if any of the individual policy conditions associated with a same level as the selected one of the summary conditions is met;

means for selecting another one of the summary conditions associated with another one of the levels and comparing the associated value of the received event to the another one of the summary conditions to determine if the another one of the summary conditions is not met;

means for comparing the associated value of the received event to ones of the individual policy conditions associated with the another one of the levels if the another one of the summary conditions is met to determine if any of the individual policy conditions associated with the another one of the levels is met; and means for controlling the means for selecting another one of the summary conditions associated with another one of the levels and the means for comparing the associated value of the received event to the another one of the summary conditions and the means for comparing the associated value of the received event to ones of the individual policy conditions associated with the another one of the levels if the another one of the summary conditions is met to repeat operations until at least one of one of the summary conditions is not met, all individual policy conditions for one of the levels are not met or at least one of the individual policy conditions for each level is met.

32. The system of claim 30 wherein the means for controlling the means for comparing to repeat comparing for others of the summary conditions and individual policy conditions until at least one of one of the summary conditions is not met, all individual policy conditions for one of the levels are not met or at least one of the individual policy conditions for each level is met further comprises:

means for selecting another one of the summary conditions associated with another one of the levels and comparing the associated value of the received event to the another one of the summary conditions to determine if the another one of the summary conditions is not met;

means for controlling the means for selecting another one of the summary conditions to repeat operations for others of the summary conditions until at least one of one of the summary conditions is not met or all of the summary conditions are met; and means for comparing the associated value of the received event to individual policy conditions until at least one of all individual policy conditions for one of the levels are not met or at least one of the individual policy conditions for each level is met if all of the summary conditions are met.

33. The system of claim 30 further comprising means for executing the action associated with the complex policy rule if at least one individual policy condition at each level is met if the complex policy rule is a CNF policy rule.

34. The system of claim 33 further comprising means for selecting one of the summary conditions most likely to not be met as the selected one of the summary conditions.

35. The system of claim 33 further comprising:

means for determining if the complex policy rule is a disjunctive normal form (DNF) policy rule; and the following means responsive to determining that the complex policy rule is a DNF policy rule:

means for generating a plurality of collapsed conditions, each of the collapsed conditions being associated with one of the levels and having a range for each group of policy conditions included in the one of the plurality of levels;

means for comparing the associated value of the received event to a selected one of the collapsed conditions to determine if the selected one of the collapsed conditions is met;

means for selecting another one of the collapsed conditions and comparing the associated value of the received event to the selected another one of the collapsed conditions to determine if the selected another one of the collapsed conditions is met if the selected one of the collapsed conditions is not met;

means for controlling the means for comparing to repeat comparing until at least one of a collapsed condition is met or all of the collapsed conditions are not met; and wherein the means for executing the action further comprises means for executing the action associated with the complex policy rule if one of the collapsed conditions is met if the complex policy rule is a DNF policy rule.

36. A system for processing a complex policy rule structured in a plurality of levels wherein the complex policy rule selects an action for execution based on a plurality of individual policy conditions, each of the individual policy conditions including a plurality of groups and being expressed as ranges for each of the groups, the system comprising:

means for determining if the complex policy rule is a conjunctive normal form (CNF) policy rule;

means for receiving an event, the event having associated values defining a point in a space covered by the plurality of conditions; and the following means responsive to determining that the complex policy rule is a CNF policy rule:

means for generating a plurality of summary conditions, each of the summary conditions being associated with a respective one of the groups for a respective one of the levels;

means for comparing a respective one of the associated values of the received event to an associated selected one of the summary conditions, the selected one of the summary conditions being associated with the same group of policy conditions as the respective one of the associated values of the received event, to determine if the associated one of the summary conditions is met;

means for determining that the complex policy rule may be skipped if the associated one of the summary conditions is not met;

means for controlling the means for comparing to repeat comparing for others of the summary conditions and individual policy conditions until at least one of one of the summary conditions is not met, all individual policy conditions for one of the levels are not met or at least one of the individual policy conditions for each of the levels is met;

means for determining that the complex policy rule may be skipped if at least one of one of the summary conditions is not met or all individual policy conditions for one of the levels are not met; and means for executing the action if at least one of the individual policy conditions for each of the levels is met if the complex policy rule is a CNF policy rule.

37. The system of claim 36 further comprising means for selecting one of the summary conditions most likely to not be met as the selected one of the summary conditions.

38. The system of claim 36 further comprising:

means for determining if the complex policy rule is a disjunctive normal form (DNF) policy rule; and the following means responsive to determining that the complex policy rule is a DNF policy rule:

means for generating a plurality of collapsed conditions, each of the collapsed conditions being associated with one of the levels and having a range for each group of policy conditions included in the one of the plurality of levels;

means for comparing the associated value of the received event to a selected one of the collapsed conditions to determine if the selected one of the collapsed conditions is met;

means for selecting another one of the collapsed conditions and comparing the associated value of the received event to the selected another one of the collapsed conditions to determine if the selected another one of the collapsed conditions is met if the selected one of the collapsed conditions is not met;

means for controlling the means for comparing to repeat comparing until at least one of a collapsed condition is met or all of the collapsed conditions are not met; and wherein the means for executing the action further comprises means for executing the action associated with the complex policy rule if one of the collapsed conditions is met if the complex policy rule is a DNF policy rule.

39. A system for processing a complex policy rule structured in a plurality of levels wherein the complex policy rule selects an action for execution based on a plurality of individual policy conditions each of the individual policy conditions being expressed as ranges and being associated with one of the levels, the system comprising:

means for receiving an event, the event having an associated value defining a point in a space covered by the individual policy conditions;

means for determining if the complex policy rule is a disjunctive normal form (DNF) policy rule; and the following means responsive to determining that the complex policy rule is a DNF policy rule:

means for generating a plurality of collapsed conditions, each of the collapsed conditions being associated with one of the levels and having a range for each group of policy conditions included in the one of the plurality of levels;

means for comparing the associated value of the received event to a selected one of the collapsed conditions to determine if the selected one of the collapsed conditions is met;

means for selecting another one of the collapsed conditions and comparing the associated value of the received event to the selected another one of the collapsed conditions to determine if the selected another one of the collapsed conditions is met if the selected one of the collapsed conditions is not met;

means for controlling the means for comparing to repeat comparing until at least one of a collapsed condition is met or all of the collapsed conditions are not met; and means for executing the action associated with the complex policy rule if one of the collapsed conditions is met if the complex policy rule is a DNF policy rule.

40. A computer program product for processing a complex policy rule structured in a plurality of levels wherein the complex policy rule selects an action for execution based on a plurality of individual policy conditions each of the individual policy conditions being expressed as ranges and being associated with one of the levels, comprising:

a computer-readable storage medium having computer-readable program code embodied in said medium, said computer-readable program code comprising:

computer-readable program code which determines if the complex policy rule is a conjunctive normal form (CNF) policy rule;

computer-readable program code which receives an event, the event having an associated value defining a point in a space covered by the individual policy conditions; and the following computer-readable program code responsive to determining that the complex policy rule is a CNF policy rule:

computer-readable program code which generates a plurality of summary conditions, each of the summary conditions being associated with one of the levels;

computer-readable program code which compares the associated value of the received event to a selected one of the summary conditions to determine if the selected one of the summary conditions is met;

computer-readable program code which determines that the complex policy rule may be skipped if the selected one of the summary conditions is not met;

computer-readable program code which controls the computer-readable program code which compares to repeat comparing for others of the summary conditions and individual policy conditions until at least one of one of the summary conditions is not met, all individual policy conditions for one of the levels are not met or at least one of the individual policy conditions for each level is met; and computer-readable program code which determines that the complex policy rule may be skipped if at least one of one of the summary conditions is not met or all individual policy conditions for one of the levels are not met.

41. The computer program product of claim 40 wherein the computer-readable program code which controls the computer-readable program code which compares further comprises:

computer-readable program code which compares the associated value of the received event to ones of the individual policy conditions associated with a same level as the selected one of the summary conditions if the selected one of the summary conditions is met to determine if any of the individual policy conditions associated with a same level as the selected one of the summary conditions is met;

computer-readable program code which selects another one of the summary conditions associated with another one of the levels and comparing the associated value of the received event to the another one of the summary conditions to determine if the another one of the summary conditions is not met;

computer-readable program code which compares the associated value of the received event to ones of the individual policy conditions associated with the another one of the levels if the another one of the summary conditions is met to determine if any of the individual policy conditions associated with the another one of the levels is met; and computer-readable program code which controls the computer-readable program code which selects another one of the summary conditions associated with another one of the levels and the computer-readable program code which compares the associated value of the received event to the another one of the summary conditions and the computer-readable program code which compares the associated value of the received event to ones of the individual policy conditions associated with the another one of the levels if the another one of the summary conditions is met to repeat operations until at least one of one of the summary conditions is not met, all individual policy conditions for one of the levels are not met or at least one of the individual policy conditions for each level is met.

42. The computer program product of claim 40 wherein the computer-readable program code which controls the computer-readable program code which compares to repeat comparing for others of the summary conditions and individual policy conditions until at least one of one of the summary conditions is not met, all individual policy conditions for one of the levels are not met or at least one of the individual policy conditions for each level is met further comprises:

computer-readable program code which selects another one of the summary conditions associated with another one of the levels and comparing the associated value of the received event to the another one of the summary conditions to determine if the another one of the summary conditions is not met;

computer-readable program code which controls the computer-readable program code which selects another one of the summary conditions to repeat operations for others of the summary conditions until at least one of one of the summary conditions is not met or all of the summary conditions are met; and computer-readable program code which compares the associated value of the received event to individual policy conditions until at least one of all individual policy conditions for one of the levels are not met or at least one of the individual policy conditions for each level is met if all of the summary conditions are met.

43. The computer program product of claim 40 further comprising computer-readable program code which executes the action associated with the complex policy rule if at least one individual policy condition at each level is met if the complex policy rule is a CNF policy rule.

44. The computer program product of claim 43 further comprising computer-readable program code which selects one of the summary conditions most likely to not be met as the selected one of the summary conditions.

45. The computer program product of claim 43 further comprising:

computer-readable program code which determines if the complex policy rule is a disjunctive normal form (DNF) policy rule; and the following computer-readable program code responsive to determining that the complex policy rule is a DNF policy rule:

computer-readable program code which generates a plurality of collapsed conditions, each of the collapsed conditions being associated with one of the levels and having a range for each group of policy conditions included in the one of the plurality of levels;

computer-readable program code which compares the associated value of the received event to a selected one of the collapsed conditions to determine if the selected one of the collapsed conditions is met;

computer-readable program code which selects another one of the collapsed conditions and comparing the associated value of the received event to the selected another one of the collapsed conditions to determine if the selected another one of the collapsed conditions is met if the selected one of the collapsed conditions is not met;

computer-readable program code which controls the computer-readable program code which compares to repeat comparing until at least one of a collapsed condition is met or all of the collapsed conditions are not met; and wherein the computer-readable program code which executes the action further comprises computer-readable program code which executes the action associated with the complex policy rule if one of the collapsed conditions is met if the complex policy rule is a DNF policy rule.

46. A computer program product for processing a complex policy rule structured in a plurality of levels wherein the complex policy rule selects an action for execution based on a plurality of individual policy conditions, each of the individual policy conditions including a plurality of groups and being expressed as ranges for each of the groups, comprising:

a computer-readable storage medium having computer-readable program code embodied in said medium, said computer-readable program code comprising:

computer-readable program code which determines if the complex policy rule is a conjunctive normal form (CNF) policy rule;

computer-readable program code which receives an event, the event having associated values defining a point in a space covered by the plurality of conditions; and the following computer-readable program code responsive to determining that the complex policy rule is a CNF policy rule:
  computer-readable program code which generates a plurality of summary conditions, each of the summary conditions being associated with a respective one of the groups for a respective one of the levels;
  computer-readable program code which compares a respective one of the associated values of the received event to an associated selected one of the summary conditions, the selected one of the summary conditions being associated with the same group of policy conditions as the respective one of the associated values of the received event, to determine if the associated one of the summary conditions is met;
  computer-readable program code which determines that the complex policy rule may be skipped if the associated one of the summary conditions is not met;
  computer-readable program code which controls the computer-readable program code which compares to repeat comparing for others of the summary conditions and individual policy conditions until at least one of one of the summary conditions is not met, all individual policy conditions for one of the levels are not met or at least one of the individual policy conditions for each of the levels is met;
  computer-readable program code which determines that the complex policy rule may be skipped if at least one of one of the summary conditions is not met or all individual policy conditions for one of the levels are not met; and
  computer-readable program code which executes the action if at least one of the individual policy conditions for each of the levels is met if the complex policy rule is a CNF policy rule.

47. The computer program product of claim 46 further comprising computer-readable program code which selects one of the summary conditions most likely to not be met as the selected one of the summary conditions.

48. The computer program product of claim 46 further comprising:
  computer-readable program code which determines if the complex policy rule is a disjunctive normal form (DNF) policy rule; and
  the following computer-readable program code responsive to determining that the complex policy rule is a DNF policy rule:
    computer-readable program code which generates a plurality of collapsed conditions, each of the collapsed conditions being associated with one of the levels and having a range for each group of policy conditions included in the one of the plurality of levels;
    computer-readable program code which compares the associated value of the received event to a selected one of the collapsed conditions to determine if the selected one of the collapsed conditions is met;
    computer-readable program code which selects another one of the collapsed conditions and compares the associated value of the received event to the selected another one of the collapsed conditions to determine if the selected another one of the collapsed conditions is met if the selected one of the collapsed conditions is not met;
    computer-readable program code which controls the computer-readable program code which compares to repeat comparing until at least one of a collapsed condition is met or all of the collapsed conditions are not met; and
    wherein the computer-readable program code which executes the action further comprises computer-readable program code which executes the action associated with the complex policy rule if one of the collapsed conditions is met if the complex policy rule is a DNF policy rule.

49. A computer program product for processing a complex policy rule structured in a plurality of levels wherein the complex policy rule selects an action for execution based on a plurality of individual policy conditions each of the individual policy conditions being expressed as ranges and being associated with one of the levels, comprising:
  a computer-readable storage medium having computer-readable program code embodied in said medium, said computer-readable program code comprising:
    computer-readable program code which receives an event, the event having an associated value defining a point in a space covered by the individual policy conditions;
    computer-readable program code which determines if the complex policy rule is a disjunctive normal form (DNF) policy rule; and
    the following computer-readable program code responsive to determining that the complex policy rule is a DNF policy rule:
      computer-readable program code which generates a plurality of collapsed conditions, each of the collapsed conditions being associated with one of the levels and having a range for each group of policy conditions included in the one of the plurality of levels;
      computer-readable program code which compares the associated value of the received event to a selected one of the collapsed conditions to determine if the selected one of the collapsed conditions is met;
      computer-readable program code which selects another one of the collapsed conditions and comparing the associated value of the received event to the selected another one of the collapsed conditions to determine if the selected another one of the collapsed conditions is met if the selected one of the collapsed conditions is not met;
      computer-readable program code which controls the computer-readable program code which compares to repeat comparing until at least one of a collapsed condition is met or all of the collapsed conditions are not met; and
      computer-readable program code which executes the action associated with the complex policy rule if one of the collapsed conditions is met if the complex policy rule is a DNF policy rule.

* * * * *